US008566861B2

(12) United States Patent
Zigmond et al.

(10) Patent No.: US 8,566,861 B2
(45) Date of Patent: Oct. 22, 2013

(54) ADVERTISEMENT TRANSCODING AND APPROVAL

(75) Inventors: Daniel J. Zigmond, Menlo Park, CA (US); Jason Bayer, Mountain View, CA (US); Greg Hecht, Mountain View, CA (US); Bryan McQuade, Concord, MA (US)

(73) Assignee: Google Inc., Mountain View, CA (US)

( * ) Notice: Subject to any disclaimer, the term of this patent is extended or adjusted under 35 U.S.C. 154(b) by 180 days.

(21) Appl. No.: 12/886,233

(22) Filed: Sep. 20, 2010

(65) Prior Publication Data

US 2011/0047567 A1 Feb. 24, 2011

Related U.S. Application Data

(63) Continuation of application No. 11/743,030, filed on May 1, 2007, now Pat. No. 7,802,280.

(60) Provisional application No. 60/909,893, filed on Apr. 3, 2007.

(51) Int. Cl.
  *H04N 7/10* (2006.01)
(52) U.S. Cl.
  USPC ............... 725/32; 725/33; 725/34; 725/35; 725/36; 705/14.01; 705/14.02; 705/14.03; 705/14.04; 705/14.05; 705/14.06; 705/14.07; 705/26.82
(58) Field of Classification Search
  None
  See application file for complete search history.

(56) References Cited

U.S. PATENT DOCUMENTS

| 5,857,190 | A | 1/1999 | Brown |
| 6,289,514 | B1 * | 9/2001 | Link et al. .................. 725/14 |
| 6,324,519 | B1 | 11/2001 | Eldering |
| 6,438,751 | B1 * | 8/2002 | Voyticky et al. ............ 725/42 |
| 6,507,949 | B1 | 1/2003 | Jonason et al. |
| 6,530,082 | B1 | 3/2003 | Del Sesto et al. |
| 6,983,478 | B1 | 1/2006 | Grauch et al. |
| 7,020,888 | B2 | 3/2006 | Reynolds et al. |
| 7,356,246 | B1 * | 4/2008 | Kobb ....................... 386/291 |
| 7,590,616 | B2 * | 9/2009 | Guan et al. .................... 1/1 |
| 7,697,070 | B1 * | 4/2010 | Dugan et al. .............. 348/556 |
| 8,128,493 | B2 * | 3/2012 | Willis et al. ................ 463/31 |
| 2002/0056107 | A1 | 5/2002 | Schlack |
| 2002/0087980 | A1 * | 7/2002 | Eldering et al. ........... 725/35 |

(Continued)

FOREIGN PATENT DOCUMENTS

| EP | 1549055 A4 | 8/2010 |
| JP | 8275138 A | 10/1996 |

(Continued)

OTHER PUBLICATIONS

Supplementary European Search Report for EP08745050, dated Oct. 7, 2011, 2 pages.

(Continued)

*Primary Examiner* — Nasser Goodarzi
*Assistant Examiner* — Paul Graham
(74) *Attorney, Agent, or Firm* — Fish & Richardson P.C.

(57) ABSTRACT

Advertising parameters and associated television advertisements are received from advertisers. The television advertisements can be designated as pending approval. An automated approval process and a television provider approval process can be utilized to approve or disapprove of the television advertisements pending approval. Approved television advertisements can be provided to the television provider, e.g., by a download process over a network.

14 Claims, 12 Drawing Sheets

(56) References Cited

U.S. PATENT DOCUMENTS

| | | |
|---|---|---|
| 2002/0129368 A1 | 9/2002 | Schlack et al. |
| 2002/0133819 A1 | 9/2002 | Jackson |
| 2002/0174424 A1 | 11/2002 | Chang et al. |
| 2003/0037333 A1 | 2/2003 | Ghashghai et al. |
| 2003/0040962 A1* | 2/2003 | Lewis ............................. 705/14 |
| 2003/0046161 A1 | 3/2003 | Kamangar et al. |
| 2003/0070167 A1 | 4/2003 | Holtz et al. |
| 2003/0093783 A1 | 5/2003 | Nelson |
| 2003/0101454 A1 | 5/2003 | Ozer et al. |
| 2003/0110497 A1 | 6/2003 | Yassin et al. |
| 2003/0115585 A1 | 6/2003 | Barsness et al. |
| 2003/0115597 A1* | 6/2003 | Yassin et al. .................... 725/36 |
| 2003/0171990 A1* | 9/2003 | Rao et al. ........................ 705/14 |
| 2004/0148625 A1* | 7/2004 | Eldering et al. ................ 725/34 |
| 2004/0163107 A1* | 8/2004 | Crystal ........................... 725/32 |
| 2004/0225562 A1 | 11/2004 | Turner |
| 2004/0230994 A1 | 11/2004 | Urdang et al. |
| 2004/0250281 A1 | 12/2004 | Feininger et al. |
| 2005/0021403 A1 | 1/2005 | Ozer et al. |
| 2005/0028188 A1 | 2/2005 | Latona et al. |
| 2005/0149964 A1 | 7/2005 | Thomas et al. |
| 2005/0204385 A1* | 9/2005 | Sull et al. ........................ 725/45 |
| 2005/0221403 A1 | 10/2005 | Gazenko |
| 2005/0222902 A1* | 10/2005 | Coit et al. ....................... 705/14 |
| 2005/0235318 A1 | 10/2005 | Grauch et al. |
| 2005/0251444 A1 | 11/2005 | Varian et al. |
| 2005/0286860 A1 | 12/2005 | Conklin |
| 2006/0010470 A1 | 1/2006 | Kurosaki et al. |
| 2006/0050785 A1* | 3/2006 | Watanabe et al. ......... 375/240.03 |
| 2006/0064716 A1* | 3/2006 | Sull et al. ........................ 725/37 |
| 2006/0085815 A1 | 4/2006 | Nguyen-Tran |
| 2006/0135235 A1* | 6/2006 | Willis et al. ...................... 463/1 |
| 2006/0195866 A1 | 8/2006 | Thukral |
| 2006/0224445 A1 | 10/2006 | Axe et al. |
| 2006/0253323 A1 | 11/2006 | Phan et al. |
| 2006/0287915 A1 | 12/2006 | Boulet et al. |
| 2006/0288400 A1* | 12/2006 | Weston et al. ................ 725/145 |
| 2007/0011050 A1 | 1/2007 | Klopf et al. |
| 2007/0022032 A1 | 1/2007 | Anderson et al. |
| 2007/0052802 A1* | 3/2007 | Kasutani et al. .............. 348/143 |
| 2007/0157245 A1 | 7/2007 | Collins |
| 2007/0186229 A1 | 8/2007 | Conklin et al. |
| 2007/0261073 A1 | 11/2007 | Blumenschein et al. |
| 2007/0282906 A1 | 12/2007 | Gabriel |
| 2008/0019610 A1 | 1/2008 | Matsuzaka et al. |
| 2008/0022301 A1 | 1/2008 | Aloizos |
| 2008/0092168 A1 | 4/2008 | Logan et al. |
| 2008/0092182 A1 | 4/2008 | Conant |
| 2008/0154858 A1 | 6/2008 | Manavoglu et al. |
| 2008/0195475 A1 | 8/2008 | Lambert et al. |
| 2008/0216107 A1 | 9/2008 | Downey et al. |
| 2008/0250446 A1* | 10/2008 | Zigmond et al. ................. 725/32 |
| 2008/0307454 A1 | 12/2008 | Ahanger et al. |
| 2009/0070836 A1 | 3/2009 | Aaby et al. |
| 2009/0150930 A1 | 6/2009 | Sherwin et al. |

FOREIGN PATENT DOCUMENTS

| | | |
|---|---|---|
| JP | 11355229 A | 12/1999 |
| JP | 2001060928 A | 3/2001 |
| JP | 2001320743 A | 11/2001 |
| JP | 2002135757 A | 5/2002 |
| JP | 2002157516 A | 5/2002 |
| JP | 2002366834 A | 12/2002 |
| JP | 200387825 A | 3/2003 |
| JP | 2003178230 A | 6/2003 |
| JP | 2003244731 A | 8/2003 |
| JP | 2005184228 A | 7/2005 |
| JP | 2005260728 A | 9/2005 |
| JP | 2005311810 A | 11/2005 |
| JP | 2005332084 A | 12/2005 |
| KR | 20000054179 | 9/2000 |
| KR | 20030070275 | 8/2003 |
| KR | 20060097268 | 9/2006 |
| WO | WO9945700 A1 | 9/1999 |
| WO | 9952285 | 10/1999 |
| WO | WO0111506 A1 | 2/2001 |
| WO | WO0165747 A1 | 9/2001 |
| WO | 03050731 | 6/2003 |
| WO | 2005010702 | 2/2005 |
| WO | 2006020580 | 2/2006 |
| WO | 2006127645 | 11/2006 |

OTHER PUBLICATIONS

Supplementary European Search Report for EP08745040, dated Oct. 7, 2011, 2 pages.

Supplementary European Search Report for EP08745048, dated Oct. 7, 2011, 2 pages.

Communication, Supplementary European Search Report for EP Application No. 08733116.1 dated Jan. 12, 2012.

Japanese Office Action, Notice of Reasons for Rejection, for JP Application No. 2010-502308, dated Sep. 4, 2012, 8 pages.

Nonfinal Office Action for EP Application No. 2010502304 dated Aug. 23, 2012, 5 pages.

Japanese Office Action, Notice of Reasons for Rejection (with English Translation) for JP Application No. 2010-502297, dated Aug. 30, 2012, 5 pages.

Japanese Office Action (with English Translation), for JP Application No. 2010-502310, dated Nov. 27, 2012, 8 pages.

* cited by examiner

ADVERTISEMENT TRANSCODING AND APPROVAL

This application is a continuation of U.S. application Ser. No. 11/743,030, filed on May 1, 2007 and which matured into U.S. Pat. No. 7,802,280 on Sep. 21, 2010, which in turn claims the benefit of U.S. Application Ser. No. 60/909,893, filed Apr. 3, 2007, the disclosures of which is incorporated herein by reference.

BACKGROUND

This disclosure relates to media advertising.

An advertiser, such as a business entity, can purchase airtime during a television broadcast to air television advertisements. Example television advertisements include commercials that are aired during a program break, transparent overlays that are aired during a program, and text banners that are aired during a program.

The cost of the airtime purchased by the advertiser varies according to both the amount of time purchased and other parameters such as the audience size and audience composition expected to be watching during the purchased airtime or closely related to the purchased airtime. The audience size and audience composition, for example, can be measured by a ratings system. Data for television ratings can, for example, be collected by viewer surveys in which viewers provide a diary of viewing habits; or by set meters that automatically collect viewing habit data and transmit the data over a wired or wireless connection, e.g., a phone line or cable line; or by digital video recorder service logs, for example. Such rating systems, however, may be inaccurate for niche programming, and typically provide only an estimate of the actual audience numbers and audience composition.

Based on the ratings estimate, airtime is offered to advertisers for a fee. Typically the advertiser must purchase the airtime well in advance of the airtime. Additionally, the advertiser and/or the television provider may not realize the true value of the airtime purchased if the ratings estimate is inaccurate, or if the commercial that is aired is not relevant in the context of the television program and/or audience.

SUMMARY

Described herein are systems and methods for television advertising. In one implementation, advertising parameters and television advertisements are received from advertisers. The advertisement parameters can be associated with the television advertisements, and the television advertisements can be designated as pending approval. A television provider can be provided access to the television advertisements pending approval, and can approve or disapprove of the television advertisements pending approval. Approved television advertisements can be provided to the television provider, e.g., by a download process over a network.

In an aspect, a method includes the actions of accessing, by a computer system, television advertisements stored in a television advertisement data store; transcoding, by the computer system, each television advertisement into a plurality of different presentation formats, wherein the presentation formats include television formats utilized by television providers; accessing, by the computer system, corresponding approval criteria for each presentation format; for each presentation format in which the television advertisement is transcoded: evaluating, by the computer system, the television advertisement in the presentation format against the corresponding approval criteria for the presentation format, and automatically approving or disapproving, by the computer system, the television advertisement in the presentation format based on the evaluation of the television advertisement in the presentation format against the corresponding approval criteria for the presentation format. Other embodiments of this aspect include corresponding systems, apparatus, and computer programs, configured to perform the actions of the methods, encoded on computer storage devices.

Particular implementations of the subject matter described in this specification can be implemented to realize one or more of the following advantages. Relevant and effective advertisements for millions of television provider subscribers can be delivered locally and/or nationwide by an automated process. The relevant advertisements can more effectively monetize airtime, which can attract additional advertisers and create greater value for the television provider's television advertisement inventory. Additionally, by measuring access of programmer inventory through subscriber viewing devices, such as set top boxes, operators can more effectively monetize specialty channels that serve smaller audiences and for which audience data have been historically difficult to measure.

Additionally, the television advertising system can, for example, create efficiencies in the buying/selling process through an automated online marketplace. For example, in one implementation, the advertising process is automated from planning the campaign, uploading the advertisement and serving the advertisement. An auction model can create pricing efficiencies for both buyers and sellers of television advertising. Advertisers can benefit from efficiencies by paying only for delivered impressions, or delivered actions, or other types of measurable events. Advertisers can also benefit form receiving the information the advertisers need to continually enhance the effectiveness of the advertiser's advertisements. The system can be implemented organically or can be implemented with third-party infrastructure partners.

Additional details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
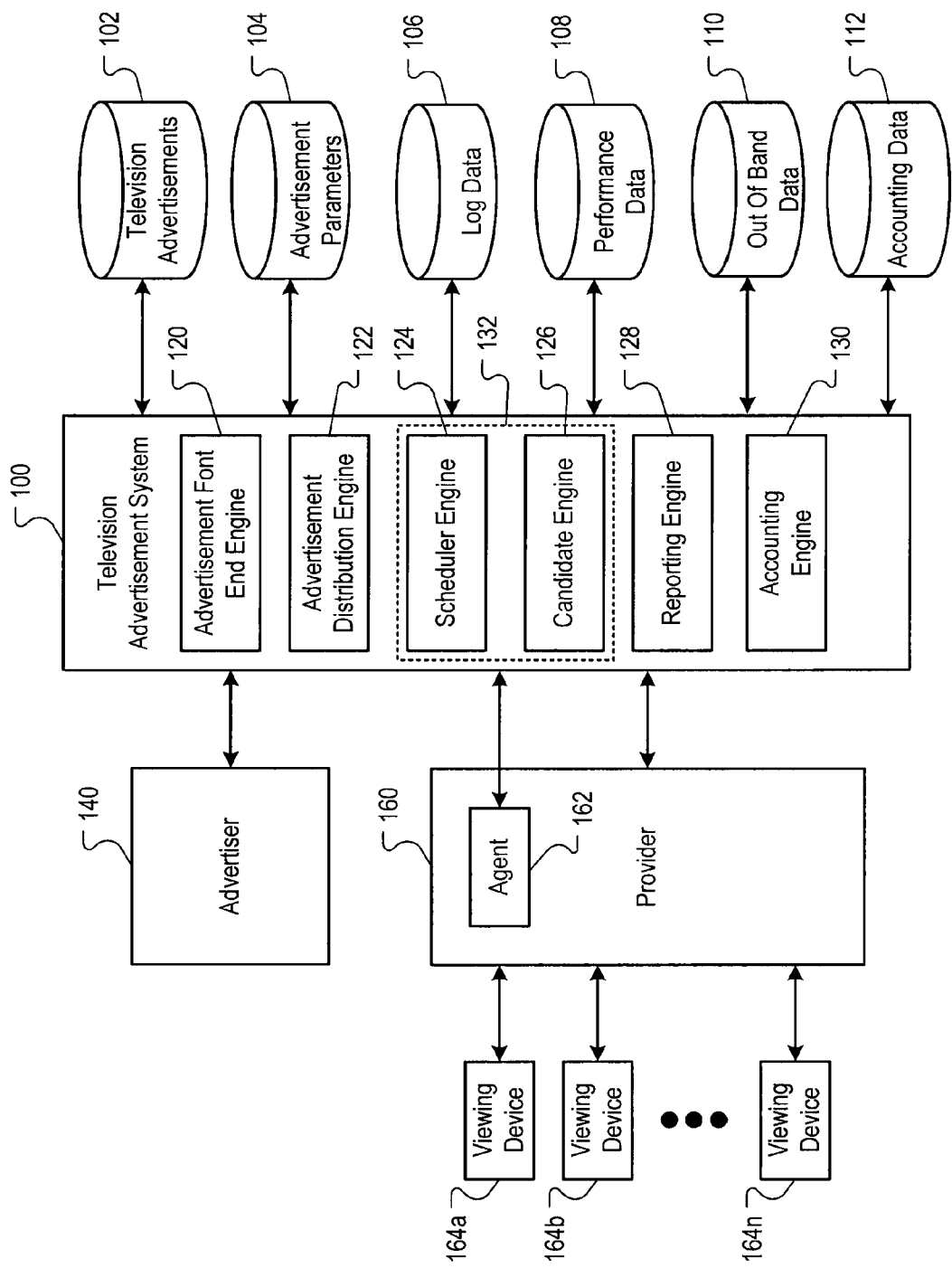
FIG. 1 is a block diagram of an example television advertisement system.

FIG. 1 is a block diagram of an example television advertisement system 100. The television advertising system 100 can, for example, deliver relevant content (e.g., advertisements, and hereinafter referred to generally as advertisements) advertisements to viewers to facilitate operator monetization of programming and quantification of advertisement delivery to target markets. The television advertising system 100 can, for example, be implemented on one or computer servers, and can provide and receive data over a network. Example networks include local area networks (LANs), wide area networks (WANs), telephonic networks, and wireless networks (e.g., 802.11x compliant networks, satellite networks, cellular networks, etc.). Additionally, the television advertising system 100 can, for example, communicate over several different types of networks, e.g., the Internet, a satellite network, and a telephonic network.

In general, the television advertising system 100 can receive television advertisements and advertisement campaign data from an advertiser 140, e.g. an entity that provides television advertisements, such as a commercial entity that sells products or services, an advertising agency, or a person. The television advertising system 100 can facilitate the provisioning of television advertisements to a television provider 160, e.g., an entity that facilitates the delivery of a television broadcast to viewers, such as cable provider, a digital satellite provider, a streaming media provider, or some other media provider. The provider 160 can, for example, receive a provider agent 162 from the television advertisement system 100. The provider agent 162 can, for example, be located at an advertising broadcast insertion location of the provider 162, e.g., at a head end of the provider.

The provider agent 162 can, for example, receive advertisement availability schedules from the provider 160 and provide the advertisement availability schedules to the television advertising system 100. For example, the provider agent 162 can read schedule requests, either in real time or ahead of time, and identify which schedule times the television advertising system 100 has permission to fill with advertisements provided by the television advertising system 100. Alternatively, the provider agent 162 can determine if one or more advertisements already scheduled or should/can be preempted or receive information that a scheduled advertisement should be preempted in accordance with one or more criteria (e.g., to improve revenue generation for the provider, or if an advertiser's budget has been depleted after a related advertisement was scheduled, etc.). The provider agent 162 can request the television advertising system 100 to identify a relevant advertisement for an identified airtime advertisement spot, e.g., an open advertisement slot or a preempted advertisement slot.

The advertisement can be deemed relevant based on advertisement meta data and an advertisement context, e.g., an advertisement for extreme sporting equipment for an advertisement having an available advertising budget may be selected for airing during a televised sporting event for which the meta data identifies as a primary demographic 18-30 year old males.

The television advertising system 100 can, for example, select candidate advertisements to air during an advertisement availability based on account advertiser bids, budgets, and any quality metrics that have been collected, e.g., conversions, viewer actions, impressions, etc. For example, advertisements can be selected to air during the advertisement availability according to a computer-implemented auction. One exampling auction is a Vickrey-style in which each advertiser pays the bid of the next highest advertisement. Other auction processes can also be used, e.g., setting an advertiser bid equal to the estimated number of viewer impressions multiplied by the price an advertiser has offered to pay for each impression, etc.

Different bidding types can be implemented in the computer-implemented auction. For example, the bidding types can be cost per airing, a cost per impression, a cost per full viewing of the advertisement, a cost per partial viewing of the advertisement, etc. Other types of costs per actions can also be use, such as a phone calls resulting from phone call solicitations; a cost per network airing (e.g., $5.00 per 1000 impressions on a first network, $6.00 per 1000 impressions on a second network), cost per action scaled by the time of day, etc. An auction process can, for example, support ads with different or even multiple (hybrid) bidding types.

The advertisements selected from the television advertising system 100 auction, the advertisement air time, and/or the advertisement can be provided to the provider 160. For example, all available advertisements, or a subset thereof, can be provided to the provider 160 prior to airing, and the provider agent 162 need only receive an advertisement identifier indicating which advertisement is to air during particular advertisement air time.

The provider agent 162 can thereafter provide a status to the television advertisement system 100 regarding when the advertisement aired. The provider agent 162 can also, for example, provide anonymized impression data related to viewing devices 164a-164n. For example, logs related to viewing device 164 activity, e.g., set top box logs, can be anonymized to remove personal information related to viewing activities and provided to the television advertising system 100. In another implementation, such information can be provided by the provider 160, or by a third party.

In one implementation, based on the impression data for the airing of the advertisement, the television advertising system 100 can charge an advertiser a fee for airing the advertisement. The fee can, for example, be substantially in proportion to the number of impressions determined for a particular airing of an advertisement.

In one implementation, the fee can, for example, be based on the bidding type. For example, the bid may be based on a cost per airing, and thus an advertiser would be charged a fee for the airing of the advertisement. Other fee determinations can also be used.

The impressions can, for example, be measured statistically. An impression can be a household impression, e.g., the airing of an advertisement in household and independent of the number of televisions in a household. If the advertisement is aired on a viewing device in the household, one household impression can be recorded. Other impression types can also be used. For example, impressions can be generated by a program rating percentage, e.g., a percentage of viewership in measurable households; or by a program share percentage, e.g., a percentage of viewership in active measured homes; or by some other statistical measurement.

By way of another example, impressions can be measured by an analysis of activity logs of the viewing devices 164. For example, a household may have three viewing devices 164, and at a given time two of the devices may be tuned to a first channel and the third device may be tuned to a second channel. If a first commercial airs on the first channel and a second commercial airs on the second channel, impressions can be generated for each viewing device.

An impression can be dependant on a channel tune status when an advertisement airs on a channel. For example, an impression can occur when a viewing device 164 is tuned to a broadcast stream in which an advertisement is inserted, and the viewing device 164 remains tuned to the broadcast stream for N consecutive seconds during the actual display time of the insertion. For example, an impression can be defined as a viewing device remaining tuned to a broadcast stream for five seconds after the advertisement begins to air. Alternatively, an impression can be defined as a viewing device tuned to a broadcast stream when an advertisement is airing and remaining tuned to the broadcast stream for five seconds after tuning to the broadcast stream. Other tune times can also be used.

Likewise, other impression types can also be used. For example, an impression can based on an advertisement exposure, e.g., a brief exposure of an advertisement, or a full viewing of the advertisement, of a threshold viewing in between, e.g., five seconds, or five seconds of the first fifteen seconds; or a percentage of the advertisement viewed, etc.

In an implementation, the television advertisement system 100 can also include one or more data stores to store television advertisements and associated data, e.g., meta data related to the television advertisements, performance data related to the television advertisements, accounting data related to the advertisers and television advertisements, etc. In one implementation, the television advertising system 100 includes an advertisement data store 102, an advertisement parameter store 104, a log data store 106, a performance data store 108, and an out of band data store 110. Additional advertisement related data can also be stored, e.g., an accounting data store 112 can store accounting data.

The television advertisement data store 102 can, for example, include advertisements that can be broadcast or aired during an advertisement spot. Example television advertisements include video advertisements, banner advertisements, overlay advertisements, such as logos, URLs, dynamic pricing information for an advertisement, etc., and other advertisements that can be used to convey information visually and/or aurally during a television broadcast.

The television advertisement parameter data store 104 can, for example, include cost per action parameters, frequency values, competitive restrictions, advertising budget data, geographic data, targeting data, etc. The television advertisement parameters 104 can, for example, be specified by the advertiser 140, and/or can be automatically updated based on the performance of advertisements during an advertisement campaign.

The log data store 106 can include data logs from viewing devices 164, e.g., set top boxes, satellite receivers, etc. The log data can include reporting data that identifies channel tunes, e.g., a channel identifier to which the viewing device was tuned, and channel tune times, e.g., the times that the viewing device was tuned to a channel. Other data can also be included, e.g., key presses of remote devices associated with the viewing devices 164, commands received by the viewing devices 164, etc. For example, if the viewing device 164 is a digital video recorder, the log data can include a list of recorded programs, and for each recorded program a record that indicates whether the recorded program has been played back, and the actions taken during playback, such as fast forwarding or skipping commercials can be included.

The performance data store 108 can, for example, include quality data, e.g., a total number of impressions for each advertisement, or an impression rate for each advertisement, and/or other quality parameter and/or impression parameters.

Example impression rates include a percentage of total potential viewers, e.g., the number of identified impressions divided by the number of subscribers; a percentage of actual impressions of a total number of impressions, e.g., a percentage of reliable impressions divided by a total number of impressions. An example reliable impression is an impression that satisfies a rule set or condition that determines that the impression was likely viewed on a viewing device by one or more persons.

Other performance data can also be stored in the performance data store 108, e.g., performance of a particular advertisement during particular programming, the probability that viewers will tune to another channel during an advertisement; the probability that viewers will fast-forward through the advertisement; etc. Such probabilities can be normalized to average behavior on a per-advertisement basis, or on a per-time slot basis, or on some other measurable basis.

Performance data can also include data related to how much of an advertisement a viewer watched when the advertisement aired. For example, statistics related to aggregate tune-in and tune-out times; number of viewers, etc. can be measured and evaluated to determine quality data related to advertisements based on viewing percentages.

The out of band data store 100 can, for example, include data related to the relevance or popularity of particular advertisements, advertisement subject matter, and television programs. For example, web pages can be mined to determine whether particular television programs are expected to have increased viewership, e.g., a sudden increase in fan pages for a program can be correlated to an increase in an expected ratings value, and the resulting data can be stored in the out of band data store 110. Other data can include data related to search queries, page views on an advertise site, etc.

Likewise, the out of band data store 110 can, for example, store date resulting from mining a video web site to identify television advertisements that are particularly popular, e.g., a video web site may record viewing statistics that indicate a particularly humorous advertisement is relatively popular among a certain demographic. Such data can be used to further refine the advertising selection process.

Additionally, web sites related to television programs can be mined to determine relevance of products or services related to the television program. For example, a particular program may reference a product in an episode, and the mining of fan sites related to the program may reveal that the product mention has generated a significant interest in the product and related products. Accordingly, advertisements related to the product and related products may be deemed more relevant for time slots during the program.

The accounting data store 112 can, for example, store accounting data related to advertisements and advertisers 140. The accounting data store 112 can store such data as campaign budgets, monthly spend parameters, and account balances for advertisers.

Other data can also be stored, such as data that can be utilized to adjust viewing forecasts, adjust pricing models, adjust relevancy measures, etc. For example, performance data related to certain products or services advertised, e.g., anonymized historical campaign data, trend analysis of program viewership, e.g., viewing statistics of program series episodes in first run, repeat, and syndication, etc. can be stored for analysis. In one implementation, data related to advertisements that were aired during time slots not served by the advertisement system 100 can be stored to analyze other advertising market models, e.g., fixed priced advertising markets, reserved advertising markets, etc.

The advertisement data store 102, advertisement parameter store 104, log data store 106, performance data store 108, the out of band data store 110 and the accounting data store 112 can be implemented separately or in combination. For example, in one implementation, the advertisement data store 102, advertisement parameter store 104 and performance data store 108 can be implemented in a single advertisement database. Other combinations and/or subcombinations can also be used.

The television advertisement system 100 can include an advertisement front end engine 120, an advertisement distribution engine 122, a scheduler engine 124, a candidate engine 126, a reporting engine 128, and an accounting engine 130. The advertisement front end engine 120, advertisement distribution engine 122, scheduler engine 124, candidate engine 126, reporting engine 128, and accounting engine 130 can, for example, be distributed among a plurality of computer devices, e.g. server computers communicating over a network, or can be implemented on a single computer, e.g., as multiple threads on a server computer. Other implementation architectures can also be used. The advertisement front end engine 120, advertisement distribution engine 122, scheduler engine 124, candidate engine 126, reporting engine 128, and accounting engine 130 can, for example, be implemented in software, such as executable object code, interpreted script instructions, or in combinations of executable and interpreted instructions. Other software and/or hardware implementations can also be used.

The advertisement front end engine 120 can, for example, be configured to receive advertisement data and television advertisements from the advertiser 140 and associate the advertisement data with the television advertisements. In one implementation, the advertisement front end engine 140 can include a web-based interface through which the advertiser 140 can upload television advertisements and associated campaign data, e.g., advertising budgets, targeting data, such as demographics and air times, product and/or service description data, such as vertical classifications, price ranges, subject matter, etc.

In one implementation, the advertisement front end engine 120 can include an approval engine configured to identify a television advertisement pending approval by the television provider 160. Utilizing the approval engine 160, the publisher may optionally review an advertisement and either approve or disapprove of the advertisement. For example, a cable provider may disapprove of advertisements that are of particularly low quality, e.g., poor sound quality, incorrect advertisement data, etc.

The advertisement distribution engine 122 can, for example, be configured to provide approved advertisements to the television provider 160. In one implementation, the advertisements are provided to the television provider 160 in advance of airing the advertisements. The provider agent 162 can periodically issue a request to the television advertising system 100 for any new advertisements to be downloaded. For any such advertisements, the provider agent 162 or the distribution engine 122 can initiate the download, and upon successful completion the provider agent 162 can notify the television advertising system 100 of a successful download. The television advertising system 100 can, for example, label the download with a particular ID that can be later user during scheduling to identify the scheduled advertisement. Accordingly, the publisher 160 can receive an advertisement identifier associated with an advertisement availability, e.g., a time slot, and can retrieve the advertisement locally at the television provider 160 premises and insert the selected advertisement into the broadcast stream.

The television advertisement scheduler engine 124 can, for example, be configured to receive a television advertisement request defining a television advertisement availability from the television provider 160, and issue a request for candidate television advertisement data, e.g., data related to advertisements that are candidates for being selected to fill the advertisement availability. The television advertisement request can include geographic data, provider identification, network data, program data, and other data. For example, a request can specify advertisements that can be shown in the geographic are of the USA/California/Bay Area/Mountain View, with a remoteRepositoryId of XX of a television provider, for a television provider YY, on a television network ZZ, to be scheduled within the time window of Monday 2:00 PM-3:00 PM, and at a preferred time of 2:16 PM.

The candidate engine 126 can, for example, be configured to identify candidate television advertisement data in response to the request for candidate television advertisement data. The identification can be based on data associated with the television advertisements, such as the data stored in the advertisement parameter data store 104. The candidate engine 126 can implement various targeting and/or filtering rules. For example, a budget restriction can be imposed if an advertiser budget is nearly depleted, and the expected fee for airing the advertisement based on expected impressions would exceed the remaining advertising budget.

Other example rules include the advertisement being successfully downloaded to the television provider 160; the advertisement targeting the location or a superset of the location where the advertisement will be showing; the advertiser 140 or advertisement must not be considered fraudulent or delinquent; the publisher 160 has approved the advertisement for showing; the advertisement is targeting this particular television network and/or time; the advertisement is targeting a television program which, through internal or third party data sources, corresponds to the given request; and the advertisement is targeting a demographic profile which, through internal or third party data sources, corresponds to the given request. Fewer or more filtering and targeting conditions can also be applied.

In response to receiving the candidate advertisement data, the television advertisement scheduler engine 124 can select one or more television advertisements to air during the television advertisement availability. The selection can be based on the television advertisement request and the candidate television advertisement data. For example, the television advertisement request can be utilized to determine a context, e.g., the context of the programming associated with the advertisement, such as sporting event, an entertainment genre, a news program, etc.; or the context of the television network, e.g., a network type; or the context of a television channel; or the context of the time of day; or a combination of any of such examples. The context can be utilized to determine a relevancy score, and the relevancy score can be utilized to scale an auction result so that bids related to advertisements that are more relevant to the identified context are scaled higher than bids related to less relevant advertisements.

In an implementation, the scheduler engine 124 and/or the candidate engine 126 can enforce advertisement restrictions. For example, the scheduler engine 124 and/or the candidate engine 126 can filter the advertisements to eliminate unwanted advertisements, e.g., frequency capping can be performed to limit the scheduling of certain advertisements based on an amount of time since the advertisement was last aired; competitive restrictions can be applied so that one advertisement cannot be placed near another advertisement of a competitor, etc.

The reporting engine 128 can, for example, receive television advertisement report data from the provider 160 and determine whether the selected television advertisement aired based on the television advertisement report data. For example, an advertisement may not air due to a programming irregularity, e.g., a sporting event going beyond a scheduled broadcast, an interruption to scheduled programming due to breaking news, etc. In an implementation, the reporting engine 128 can process reporting logs, e.g., set top box logs, from viewing devices 164 to determine advertisement impressions.

The accounting engine 130 can, for example, receive the impression data from the reporting engine 128 and generate accounting data for advertisers. In one implementation, the accounting data can detail fees owed to the television advertising system 100. The fees can, for example, be based on a cost per action parameter associated with an advertisement. For example, if an advertiser has specified $10.00 as a maximum cost per thousand impressions for a television commercial, and the reporting data indicates that 420,000 reliable impressions were generated from airing the advertisement, then the advertiser may be billed for $4,200.

In another implementation, the accounting data can detail fees owed to the television advertising system 100 and the publisher pursuant to a revenue sharing agreement. An example revenue sharing agreement can include a percentage split between the operator of the television advertisement system 100 and the television provider 160. For example, the operator of the television advertising system may receive 20% of the fee, and the operator of the publisher 160 may receive the remaining 80% of the fee. Another example revenue sharing agreement can include a first fee up to a maximum cap going to the operator of the television advertisement system, and the remaining fee going to the operator of the television provider 160. For example, the operator of the television advertising system may receive the first $500 of the fee, and the operator of the publisher 160 may receive the remainder of the fee. Other revenue sharing agreements can also be used.

The advertisement front end engine 120, advertisement distribution engine 122, scheduler engine 124, candidate engine 126, reporting engine 128, and accounting engine 130 can be implemented separately or in combination. For example, in one implementation, the scheduler engine 124 and the candidate engine 126 can be integrated as a single auction engine 132 on a computing device. Other combinations and/or subcombinations can also be used.

The system 100 of FIG. 1 can also facilitate the serving of other types of advertisement availabilities. For example, in addition to serving advertisement availabilities related to advertisement spots, times slots, and pods, advertisement availabilities that are dynamic, e.g., availabilities that are decided in real time, can also be served. An example dynamic availability can include the canceling of a scheduled advertisement, either at the request of the advertiser or automatically, such as when the advertiser's budget is depleted; or in the event of a programming delay, e.g., a programming delay for a live event, etc.

Figure 2:
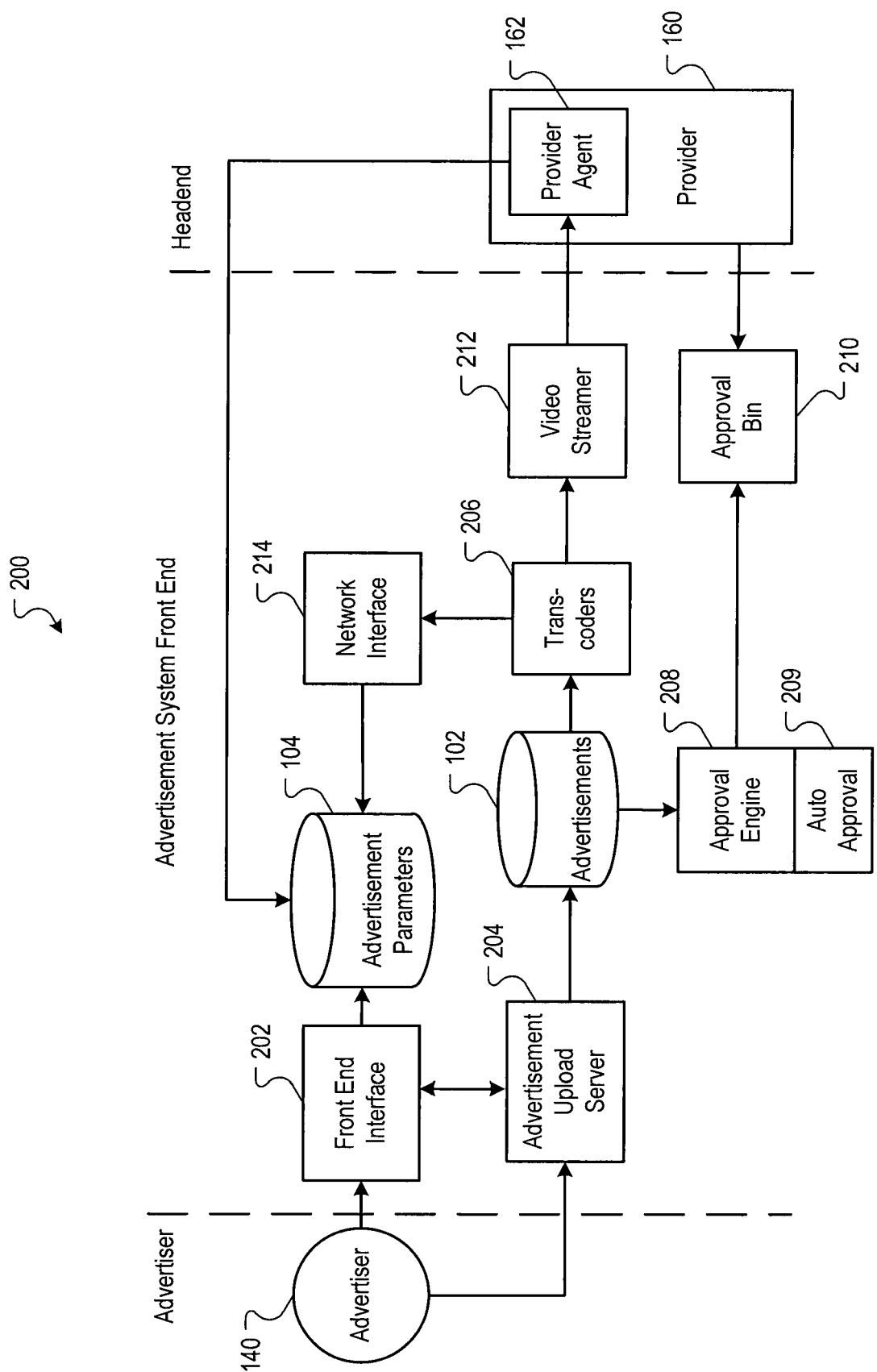
FIG. 2 is a block diagram of an example television advertisement front end system.

FIG. 2 is a block diagram of an example television advertisement front end system 200. The television advertisement front end system 200 can, for example, be implemented in the advertisement system 100 of FIG. 1.

The advertisement front end system 200 can facilitate the provisioning of advertisement data and television advertisements from the advertiser 140 or an agent of the advertiser, and can facilitate associating the advertisement data with the television advertisements. In one implementation, the advertisement front end system 200 can include a web-based front end interface 202 and an advertisement upload server 204 through which the advertiser 140 can upload television advertisements and associated campaign data associated with the advertisements, e.g., advertising budgets, targeting data, such as demographics and air times, product and/or service description data, such as vertical classifications, price ranges, subject matter, etc. FIGS. 5-9 provide example front end user interface environments.

In one implementation, the advertisement upload server 204 can receive digital representations of the advertisements, e.g., video files, audio files, and text data files, that define the advertisements, e.g. video advertisements, including commercials, banners, and logo overlays; audio advertisements, and text-based advertisements. In another implementation, the advertisements can be provided to the advertising front end system 200 in either digital or analog form, e.g., video tapes, DVDs, etc., for processing for storage into the advertisement data store 102.

The advertisements stored in the advertisement data store 102 may require transcoding into one or more different presentation formats. For example, an advertisement may be provided in high definition and in a first aspect ratio; the advertisement may thus be transcoded to conform to another video standard, such as NTSC or PAL. The transcoded advertisements can be accessed by a video streamer 212 and provided to provider 160 for local storage. In one implementation, the provider agent 162 can poll the advertisement front end system 200 periodically, e.g., daily or weekly, to request any new advertisements that have been uploaded and processed by the advertisement front end system 200. Alternatively, the provider agent 162 can request now advertisements after being unable to locate an advertisement locally, or if the provider 160 indicates that an advertisement cannot be located in a local data store.

In one implementation, newly added advertisements can be designated as pending approval, and an approval engine 208 can be configured to identify television advertisements pending approval by a television provider and store the pending advertisements, or links to the pending advertisements, in an approval bin 210. The approval engine can receive television provider 160 approval data for each television advertisement pending approval and approve or disapprove the television advertisement based on the television provider approval data. Approved advertisements can thereafter be downloaded or otherwise accessed by the provider 160; conversely, disapproved advertisements will not be provided to the provider 160. Accordingly, only approved advertisements will air on broadcast signals generated by the provider 160.

In one implementation, advertisements awaiting approval can be automatically approved after an expiration of a time period, e.g., 72 hours. In another implementation, advertisements awaiting approval can be automatically disapproved after an expiration of the time period.

In another implementation, the approval engine can receive front end system 200 approval data for each television advertisement pending approval and approve or disapprove the television advertisement based on the front end system 200 approval data. For example, an operator of the front end system 200 may enforce various polices for advertisements, e.g., quality requirements, subject matter, etc.

In one implementation, the approval engine 208 can include an automated approval engine 209 that is configured to store approval criteria for each presentation format and evaluate a television advertisement in a presentation format against the corresponding approval criteria. Based on the evaluation, the automated approval engine 209 can automatically approve or disapprove the advertisement. For example, approval criteria based on color balance, sound balance, etc. can be utilized to automatically approve a transcoded advertisement. The automatically approved advertisements or access to the automatically approved advertisements can thereafter be provided to the approval bin 210.

After the advertisements are downloaded to the provider 160, or after the provider is otherwise provided access to the advertisements so that the advertisements can be aired by the provider, the provider agent 162 can provide an acknowledgment signal to the advertisement front end system 200. The acknowledgement signal can, for example, specify that the publisher has received an advertisement or otherwise has access to the advertisement for airing. The acknowledgement signal can identify the publisher and be stored in the advertisement parameter data store 104 so that each advertisement can be associated with a corresponding list of publishers 160 that can air the advertisement.

In one implementation, a network interface 214 can be utilized to provide access to the advertisements stored in the advertisement data store 104. For example, the network interface 214 can include a search engine interface and can serve the advertisements over a network, such as the Internet, in response to search queries that are relevant to the advertisement. In an implementation, the advertiser 140 can specify whether an advertisement that can be aired by the publisher can likewise be served over a network through the network interface 214.

Figure 3:
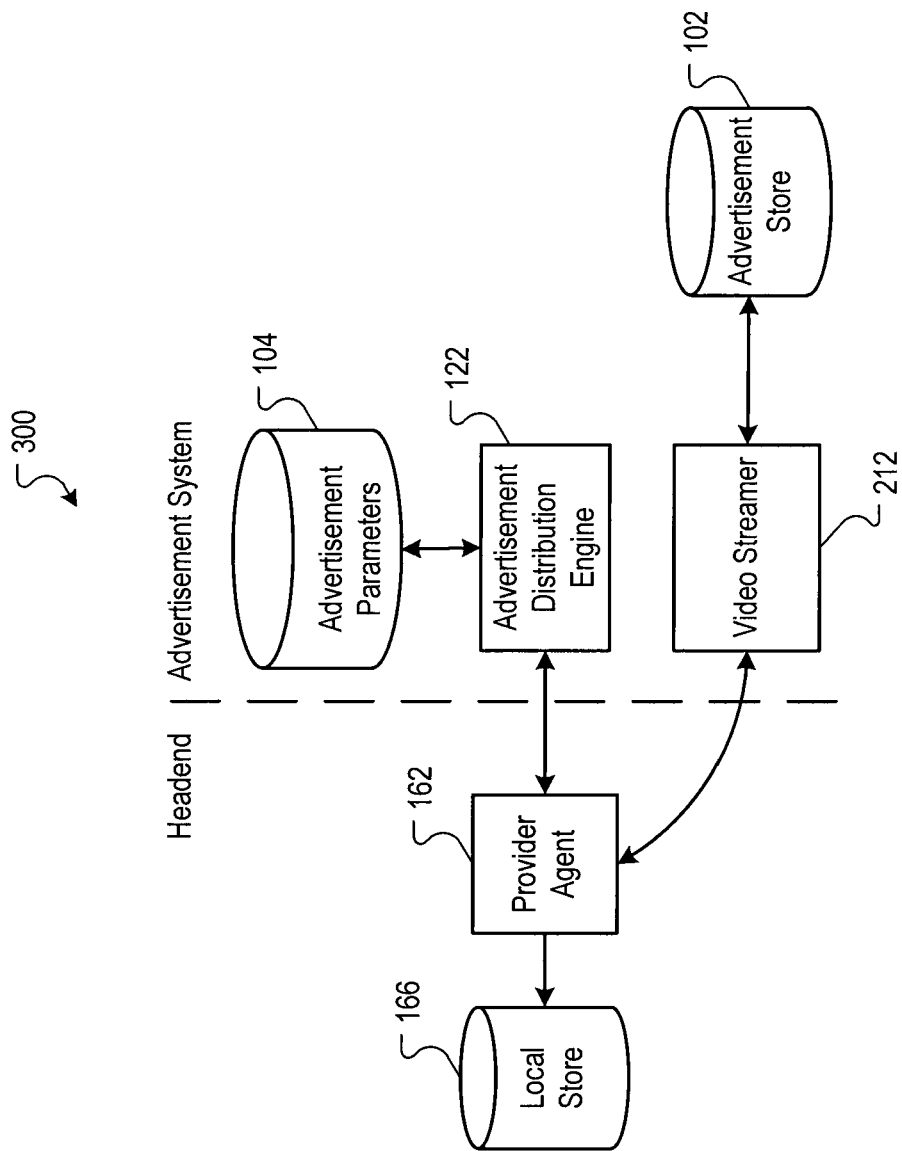
FIG. 3 is a block diagram of an example television advertisement distribution system.

FIG. 3 is a block diagram of an example television advertisement distribution system 300. The advertisement distribution system 300 can, for example, be implemented in the advertisement system 100 of FIG. 1.

The advertisement distribution system 300 facilitates the storing of advertisements on a local data store, e.g., local store 166, associated with the television advertiser 160. The storage of the advertisement at a local store 166 can, for example, facilitate real-time or near real-time auctioning and scheduling of advertisements, e.g., auctioning and scheduling advertisements for available time slots or spots only hours or even minutes before the occurrence of the time slot.

In one implementation, the provider agent 162 can communicate with the advertisement distribution engine 122 to determine whether advertisements are available for storage on the local store 166. In one implementation, the provider agent 162 can poll the advertisement distribution engine 122 periodically, e.g., daily, weekly, etc. In another implementation, the advertisement distribution engine 122 can send a notification to the provider agent 162 when an advertisement is available for download, e.g., in response to the provider 160 approving one or more advertisements.

If advertisements are available for download, the advertisement distribution engine 122 can direct the provider agent 162 and a video streamer, e.g., the video steamer 212, to establish a communication session for downloading the advertisements from the advertisement store 102 to the local store 166. Additional data can also be downloaded, e.g., an advertisement identifier, or other advertisement parameters, e.g., stored in the advertisement parameter store 104. Upon a successful completion of the download, the provider agent 162 can send an acknowledgement signal to the advertisement distribution engine 122. The acknowledgment signal can, for example, be utilized to associate an advertisement with a television provider location, and to indicate that the television advertisement is stored in a local store 166 at the locus of the provider 160.

In one implementation, the advertisement distribution engine 122 can evaluate advertisement parameters stored in the advertisement parameter store 104 to determine to which providers 160 the advertisements should be distributed. For example, if the advertisement parameters specify that an advertisement is related to a California marketing campaign, the advertisement will only be distributed to providers 160 that service the California market.

In one implementation, the advertisement can be transcoded by the advertisement system 100 into a presentation format specified by the provider 160. In another implementation, the provider 160 can receive the advertisement in a standard format, e.g., and MPEG format, and transcode the advertisement into a suitable presentation format.

In another implementation, the advertisements can be streamed from the television advertising system 100 to the provider 162 in near-real time or during air time. Accordingly, the advertisements need not be stored in a local data store 166.

Figure 4:
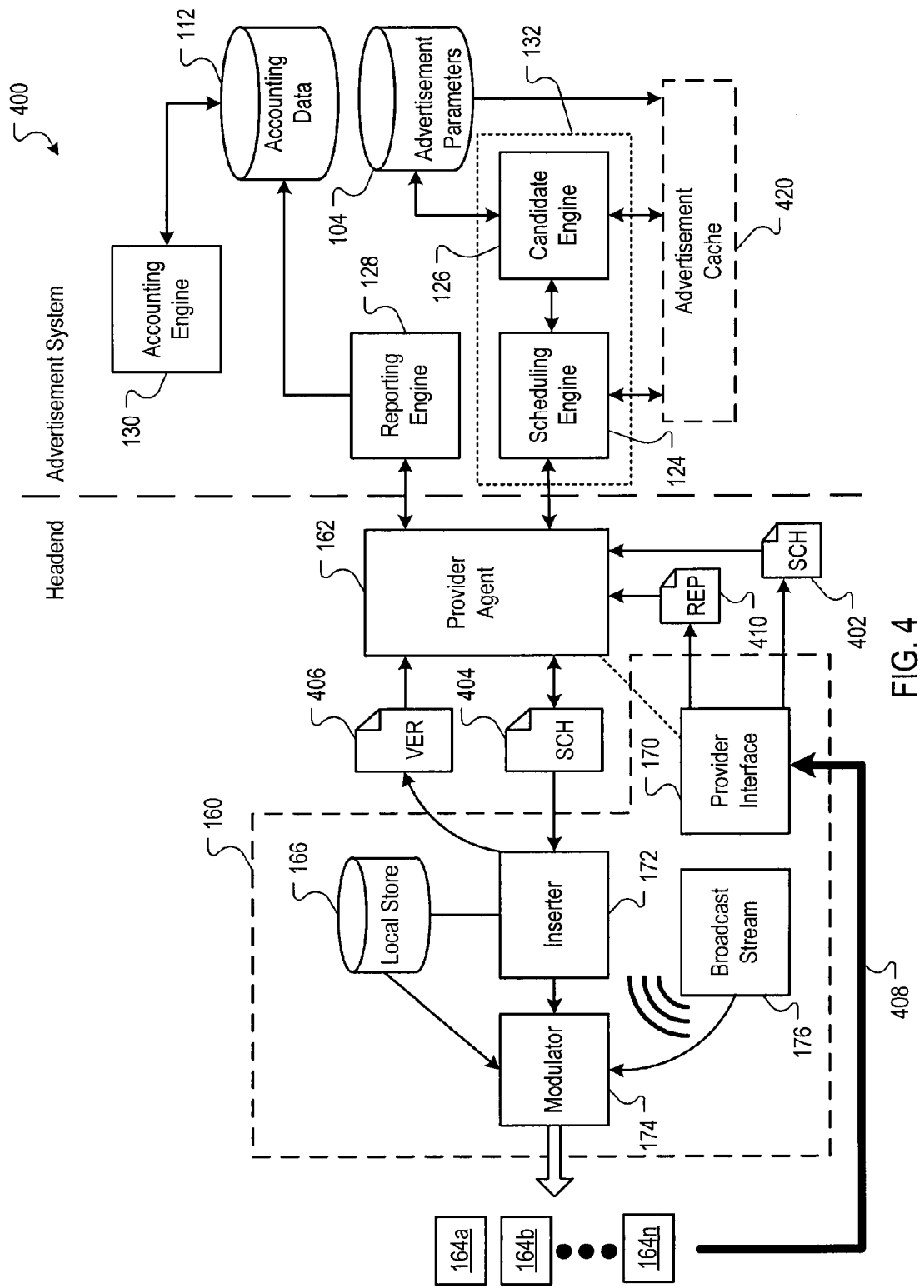
FIG. 4 is a block diagram of an example television advertisement scheduling and reporting system.

FIG. 4 is a block diagram of an example television advertisement scheduling and reporting system 400. The television advertisement scheduling and reporting system 400 can, for example, be implemented in the advertisement system 100 of FIG. 1.

In one implementation, the provider agent 162 can receive advertisement requests or advertisement availabilities in the form of an availability schedule 402. The availability schedule 402 can include a list of advertisement availabilities, e.g., time slots, corresponding contexts, e.g., television programs, the advertisement availability type, e.g., a single spot or a pod of several spots; and other data, such as geographic data, provider identification data, network data, etc.

The availability schedule 402 can, for example, be provided periodically, e.g., on a weekly basis for a coming week; or on a daily basis, or at near real-time or in real time. The provider agent 162 can, for example, communication with a provider interface 170, such as an API for a data server managed by the provider 160. In another implementation, the provider interface 170 can be implemented in the provider agent 162.

The provider agent 162 can provide the availability schedule 402 to the scheduling engine 124 of the advertisement scheduling and reporting system 400. The scheduling engine 124 can, for example, communicate with the candidate engine 126 to identify candidate television advertisement data associated with advertisements that are eligible to fill the advertisement spots that are specified in the availability schedule 402. The candidate engine 126 can implement various targeting and/or filtering rules as described with respect to FIG. 1 above.

The scheduling engine 124 can select one or more television advertisements to air during the television advertisement availability defined in the availability schedule 402. The selection can be based on the availability schedule 402, e.g., the time slots and associated context, and the candidate television advertisement data. The context can be utilized to determine a relevancy score, and the relevancy score can be utilized to scale an auction result so that bids related to advertisements that are more relevant to the identified context are scaled higher than bids related to less relevant advertisements.

The scheduling engine 124 can utilize a Vickrey-style auction based on a cost per action, e.g., a cost per 1000 impressions, or a cost per network ($5.00 on network M, $6.00 on network Y), etc. multiplied by a quality score, e.g., a historical impression rate associated with the advertisement, such as a number of viewers that are determined to have viewed the advertisement divided by the total number of viewers that received the advertisement. Other factors that can be used to determine the quality score can be derived from the performance data stored in performance data store 108, e.g., the performance of a particular advertisement during particular programming, the probability that viewers will tune to another channel during an advertisement; the probability that viewers will fast-forward through the advertisement; etc.

For example, assume the candidate engine 126 identifies three advertisements suitable for a particular advertisement spot. The scheduling engine 124 may determine an auction rank of the advertisements by multiplying the maximum cost per action for the advertisements by the quality score of the advertisements. To illustrate, suppose the quality score (QS) of advertisements A, B, and C are "2," "3," and "1.2," respectively. The rank of advertisements A, B, and C can be determined as follows:

$A$: Rank=QS×maximum cost per action=2.0× $5.00=10.00

$B$: Rank=QS×maximum cost per action=3.0× $7.50=22.50

$C$: Rank=QS×maximum cost per action=1.2× $10.00=12.00

The advertisers can thus be ranked as follows:
1. B
2. C
3. A

Accordingly, the advertisement B would be selected and displayed during the advertisement spot. In one implementation, the actual cost an owner of the advertisement B will pay per thousand impressions can be determined by the subsequent advertisement rank (C) divided by the score of the advertisement B, e.g., 12/3=$4.00. Other auction processes can also be used.

In another implementation, for a set of advertisement spots, e.g., a pod of several 30-second advertisement spots, each spot can be auctioned separately. In another implementation, an entire pod can be auctioned, and the highest ranked advertisements can be selected for showing during the pod. For example, if the auction illustrated above for advertisements A, B and C was conducted for a pod of two advertisement spots, commercials B and C would be selected.

In one implementation, an impression rate can be set to an initial default value, e.g., a rate equal to an aggregate impression rate for advertisements in a related demographic or targeting area, and can thereafter be modified based on historical performance.

In an implementation, the scheduler engine 124 and/or the candidate engine 126 can enforce advertisement restrictions. For example, the scheduler engine 124 and/or the candidate engine 126 can filter the advertisements to eliminate unwanted advertisements, e.g., competitive restrictions can be applied so that one advertisement cannot be placed near another advertisement of a competitor. For example, a television advertisement availability window for an advertisement spot can be generated. The advertisement availability window can be time based, e.g., five minutes, or can be advertisement based, e.g., three advertisement spots prior to the advertisement spots and three advertisement spot subsequent to the advertisement spot. Advertisements that have associated competitive restrictions that are exclusive of the competitive restrictions of the television advertisements that are selected to air during the television advertisement availability window can thus be precluded from selection for that availability window. For example, if company A and company B are direct competitors for the same product, and an advertisement slot is available for auction, an advertisement for company B may only eligible to auction if an advertisement for company A has not or will not air during the associated advertisement availability window e.g., within a predetermined number of advertisement slots or predetermined amount of time.

Frequency capping can be performed to limit the scheduling of certain advertisements based on an amount of time since the advertisement was last aired. For example, frequency values associated with the television advertisements can be recorded, e.g., the rate of showings of the advertisements per hour. If a current frequency value of an advertisement exceeds a repetition threshold, the advertisement may be precluded from being shown during an advertisement availability.

Likewise, geographic data can be used to filter local advertisements. For example, the availability schedule may define an advertisement availability in San Francisco, Calif. Accordingly, targeted local advertisements that are not targeted to San Francisco, e.g., a local car dealership in Los Angeles, Calif., may be precluded from being shown during an advertisement availability for the locality of San Francisco.

Once the advertisements are selected for an advertisement availability, data related to the selected advertisements and intended display times, e.g. advertisement identifiers and corresponding time slots that the corresponding advertisements are to be shown, can be provided to the provider 160 as an advertisement schedule 404. The advertisement schedule 404 can be accessed by an inserter 172 and a modulator 174 that are utilized to insert advertisements stored in the local store 166 into a broadcast stream 176.

A verification report 406 that includes data indicating whether the advertisement aired can be provided to the provider agent 162. In one implementation, the verification report 406 includes data that indicates whether the advertisement aired, the air time of the advertisement, and the channel on which the advertisement aired. The provider agent 162 can, in turn, transmit the verification report 406 to the television advertisement scheduling and reporting system 400 for processing by the reporting engine 128 and storing in the accounting data 112. Depending on contractual obligations, e.g., whether the advertisers are billed according to impressions or are charged a flat fee, the accounting engine 130 may then charge any fees due to the corresponding advertiser account.

In another implementation, data related to actual viewings, e.g., impression data 408, can be provided to the provider 160. The impression data 408 can, in turn, be provided to the provider agent 162 as an impression data report 410. The impression data report 410 can be provided to the reporting engine 128 for processing to determine an impression value related to the actual and/or estimate of the number of impressions. The impression value can be used by the accounting engine 130 to charge any fees due to the corresponding advertiser account.

In one implementation, the impression data 408 can be defined by viewing device 164 logs, e.g., set top box activity data. For example, user activity, including channel changes and timestamps, can be recorded and provided to the provider 160 periodically, e.g., daily or weekly, in the form of logs. The logs can, for example, be processed by the reporting engine 128 so that the timestamps are correlated to the times of advertisement insertions. In one implementation, each viewing device 164 that was tuned to a broadcast stream during a time at which an advertisement was inserted is counted as an impression. Additionally, other impression data can also be determined, such as tune-in and tune-away times for partial views of an advertisement. As the log data can effectively measure impressions for tuned televisions, multiple impressions can be generated per household.

In another implementation, a caching layer 420 can be utilized to cache data related to advertisement selection and processing of advertisement requests. The caching layer 420 can, for example, be utilized to optimize performance of the auctioning process.

In one implementation, the provider agent 162 can anonymize data related to particular viewing devices 164 and account information before the data are received by the television advertising scheduling and reporting system 400. Each viewing device 164 can be represented as an anonymous entity, and account information can be associated with a location information that has no more granularity than a zip code.

In another implementation, the impression data 408 can be defined by statistical measurements, e.g., by local and/or regional sampling and extrapolation to a viewership estimate, and can be provided by a third party. For example, Nielsen ratings data can be used to determine a viewership estimate and corresponding impression estimate.

In another implementation, advertisements can be targeted to video-on-demand users, digital video recorder users, and the like. Accordingly, the advertisement scheduling data 404 can include real time or near real time requests.

FIGS. 5-9 are example television advertisement front end environments. The front end environments of FIGS. 5-9 can, for example, be implemented as a web-based user interface for advertisers 140 to the advertising system 100. Other front end environments, however, can also be used. The front end environments of FIGS. 5-9 can be utilized to provide advertisements to the television advertisement system 100, and to provide television advertisement parameters and other data for association with the advertisements.

Figure 5:
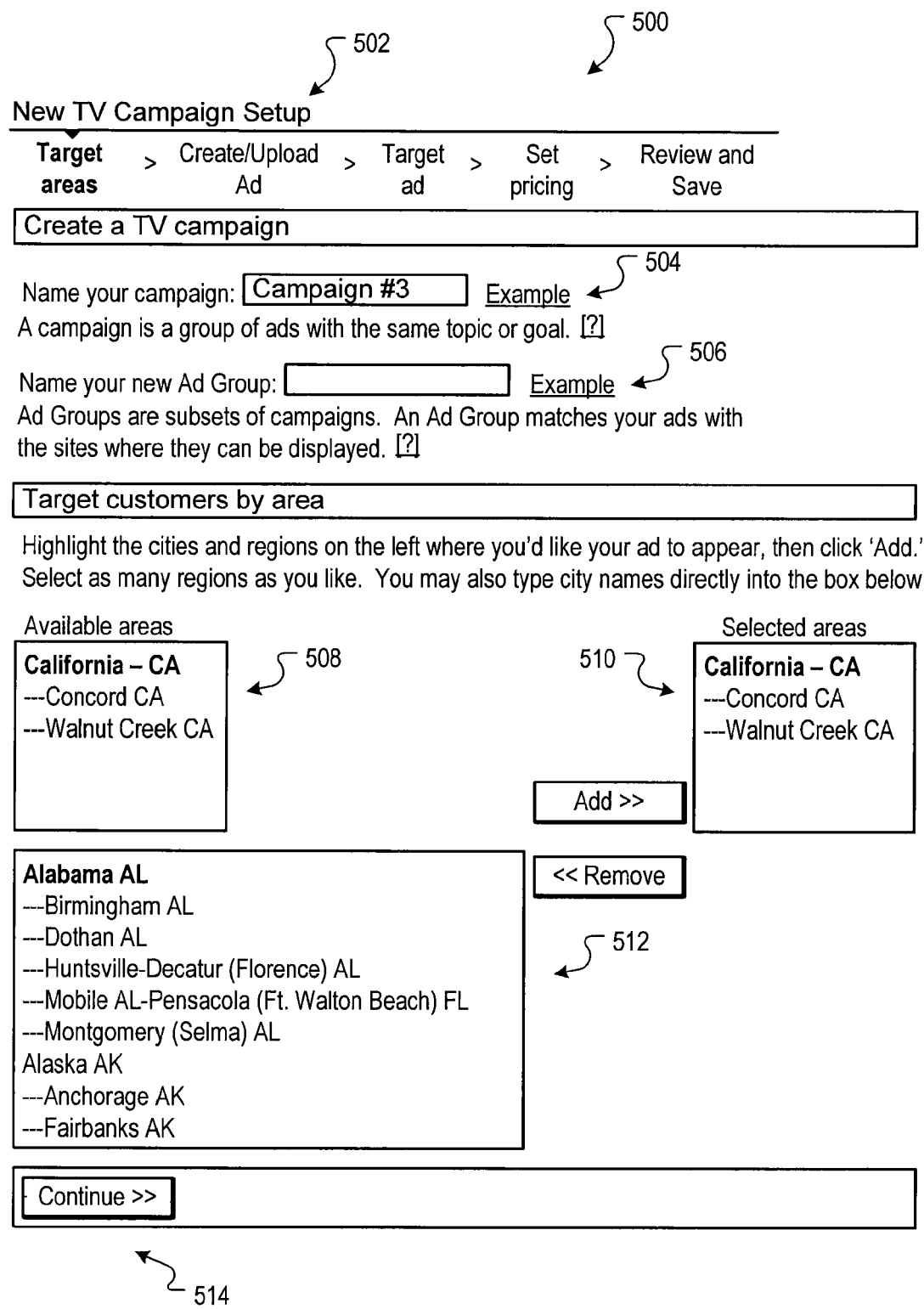
FIGS. 5-9 are example television advertisement front end environments.

FIG. 5 is a screen shot of an example targeting area environment 500, as indicated by the highlighted "Targeting Areas" setup stage on the setup menu 502. A campaign name can be entered in a campaign name field 504. A campaign can, for example, be a set of advertisements that are subject to a particular advertising rule set, e.g., a set of advertisements that share a common target demographic, for example.

An Ad Group can be defined in an Ad Group name field. An Ad Group can, for example, be a subset of a campaign. For example, a nation wide advertisement campaign can be divided into regional Ad Groups, e.g., Boston, Los Angeles, Seattle, etc.

An Available Areas frame 508 can be browsed to select available areas to target the advertisement campaign, and a Selected Areas frame 510 can display selected areas for the campaign. As shown in FIG. 5, available areas are divided into state regions. Additional geographic areas can be loaded into the Available Areas frame 508 by selecting an additional area, e.g., a state, in the Additional Areas frame 512.

A navigation button 514 can be selected to continue to the next advertisement front end environment, an advertisement creation and upload environment 600.

Figure 6:
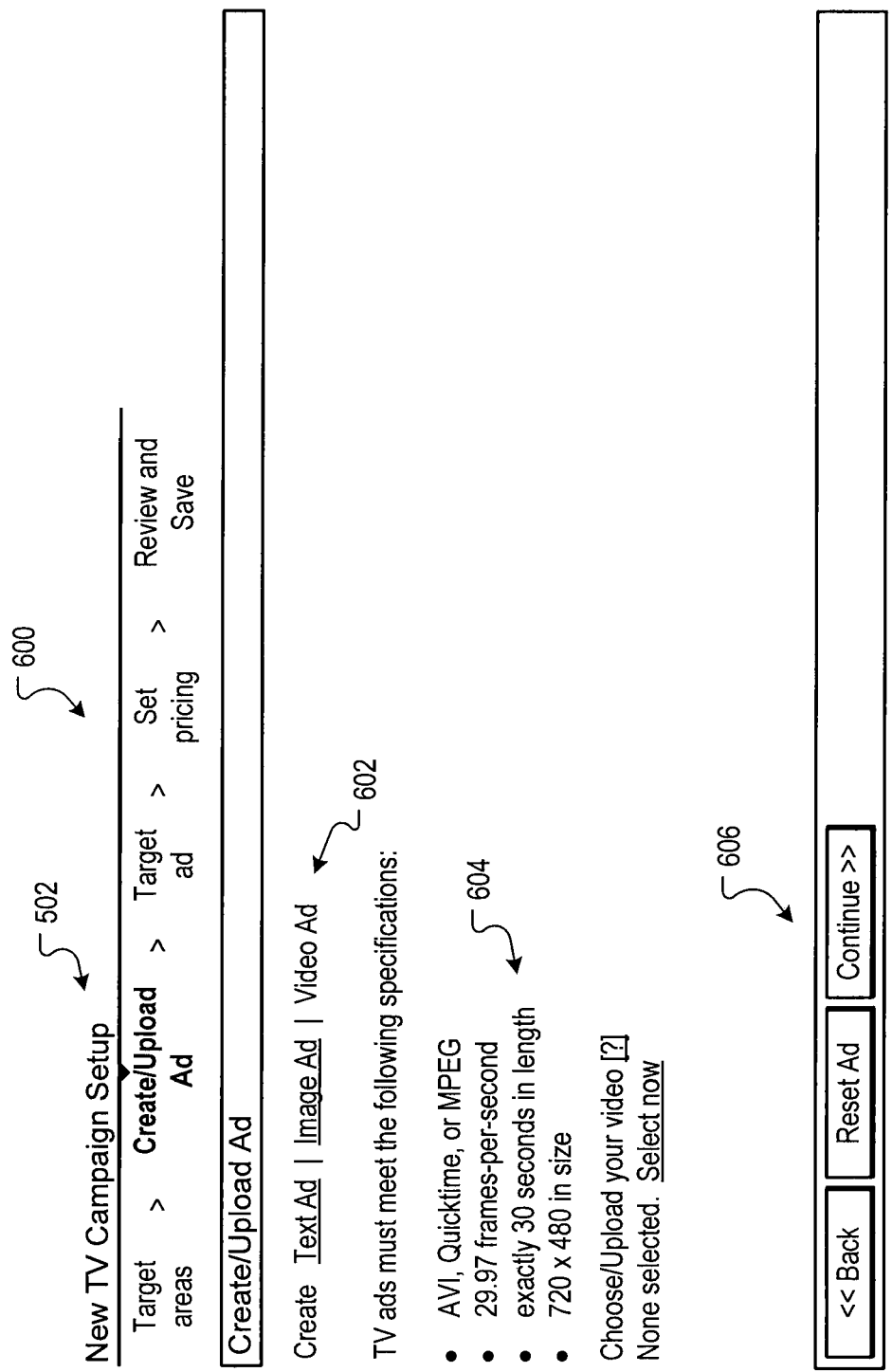

FIG. 6 is a screen shot of an example advertisement creation and upload environment 600, as indicated by the highlighted "Create/Upload Ad" setup stage on the setup menu 502. An advertisement type can be selected from an advertisement menu 602. For example, the advertisement menu 602 can be utilized to create and/or upload a text advertisement, e.g., a ticker advertisement that can be shown on the bottom or the side of a television screen; an image advertisement, such as a logo overlay; and a video advertisement, such as a television commercial.

Advertisement specifications 604 required for uploading an advertisement to the television advertisement system 100 can be displayed beneath a selected advertisement type. For example, the advertisement specifications 604 for a video advertisement 602 are shown.

Navigation buttons 608 can be selected to return to the previous advertisement front end environment 500, or to continue to the next advertisement front end environment, a targeting advertisement environment 700.

Figure 7:
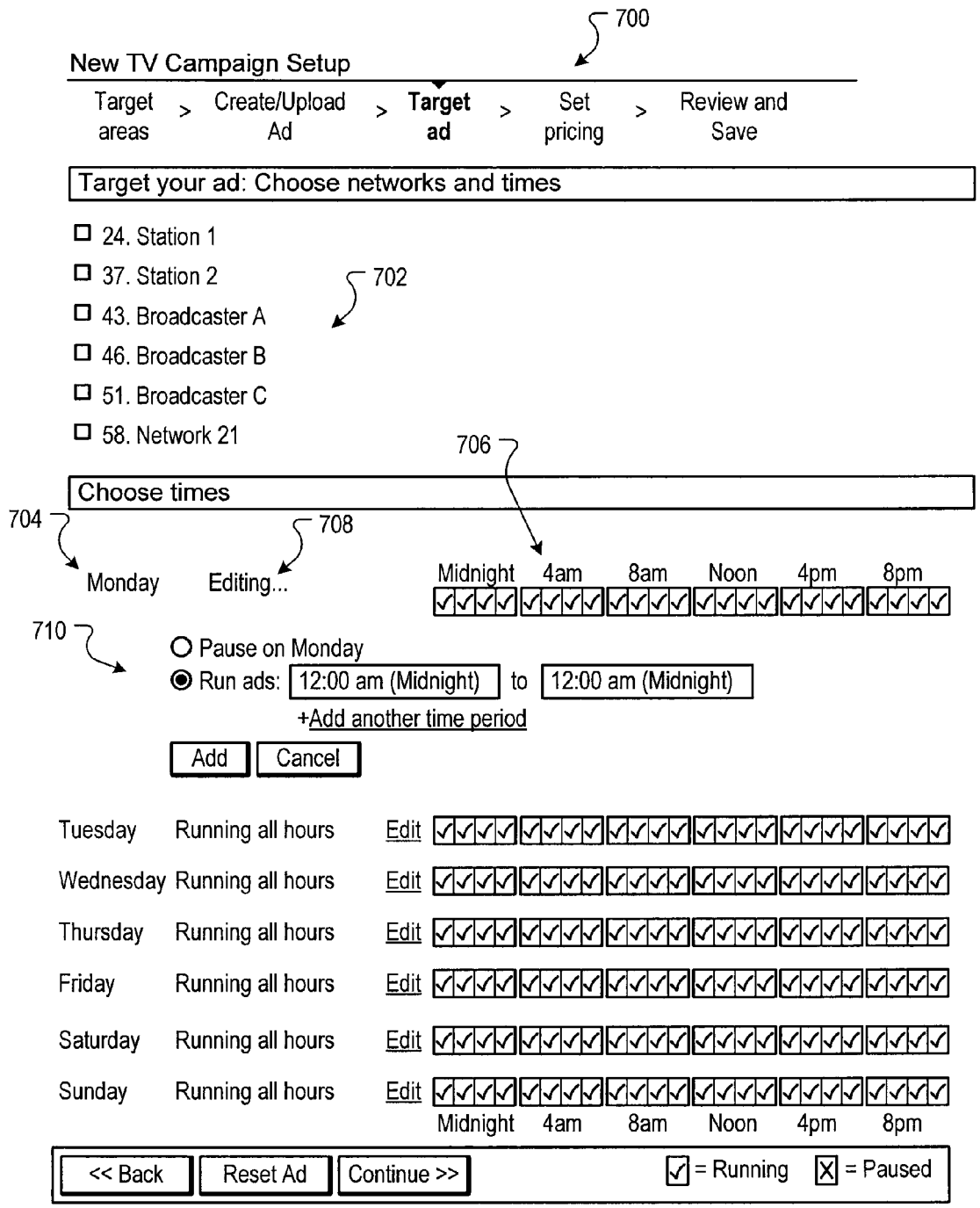

FIG. 7 is a screen shot of an example targeting advertisement environment 700, as indicated by the highlighted "Target Ad" setup stage on the setup menu 502. One or more broadcast networks or stations can be selected from list of broadcast stations 702 carried by a provider, e.g. provider 160, for showing advertisements in a campaign.

Scheduling data can be displayed on, for example, a weekly basis, as indicated by the weekday list 704. Each weekday can have associated eligibility times 706, e.g., times during which the advertiser desires the advertisement to be aired. A status indicator 708 can indicate a current status of a particular weekday status, e.g., "Running all hours," or "Running afternoon and early evening," etc. An edit menu 710 can be utilized to edit associated eligibility times 706 for a particular weekday.

Navigation buttons 712 can be selected to return to the previous advertisement front end environment 600, or to continue to the next advertisement front end environment, a pricing environment 800.

Figure 8:
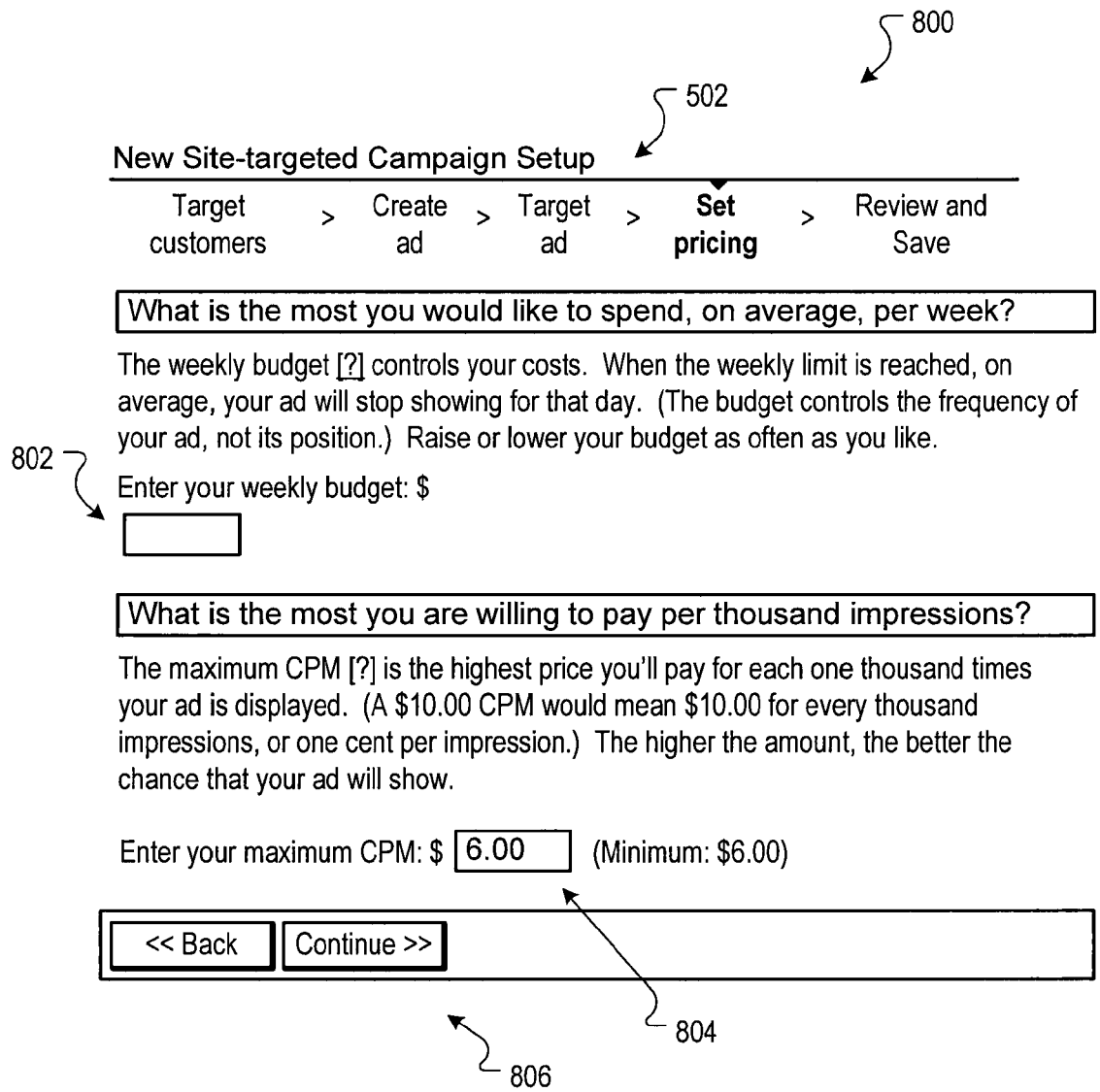

FIG. 8 is a screen shot of an example pricing environment 800, as indicated by the highlighted "Set Pricing" setup stage on the setup menu 502. Budget data, such as weekly spend data, can be input into a budget field 802. In one implementation, the budget data can be utilized to ensure that an advertiser budget is not exceeded during a specified period.

A cost per action, e.g., a cost per thousand impressions, can be input in a cost per action field 804. In one implementation, the cost per action can be a maximum cost per action that an advertiser is willing to pay for a particular action. Other costs per actions can also be used, e.g., a cost per slot, etc.

Navigation buttons 806 can be selected to return to the previous advertisement front end environment 700, or to continue to the next advertisement front end environment, a review environment 900.

Figure 9:
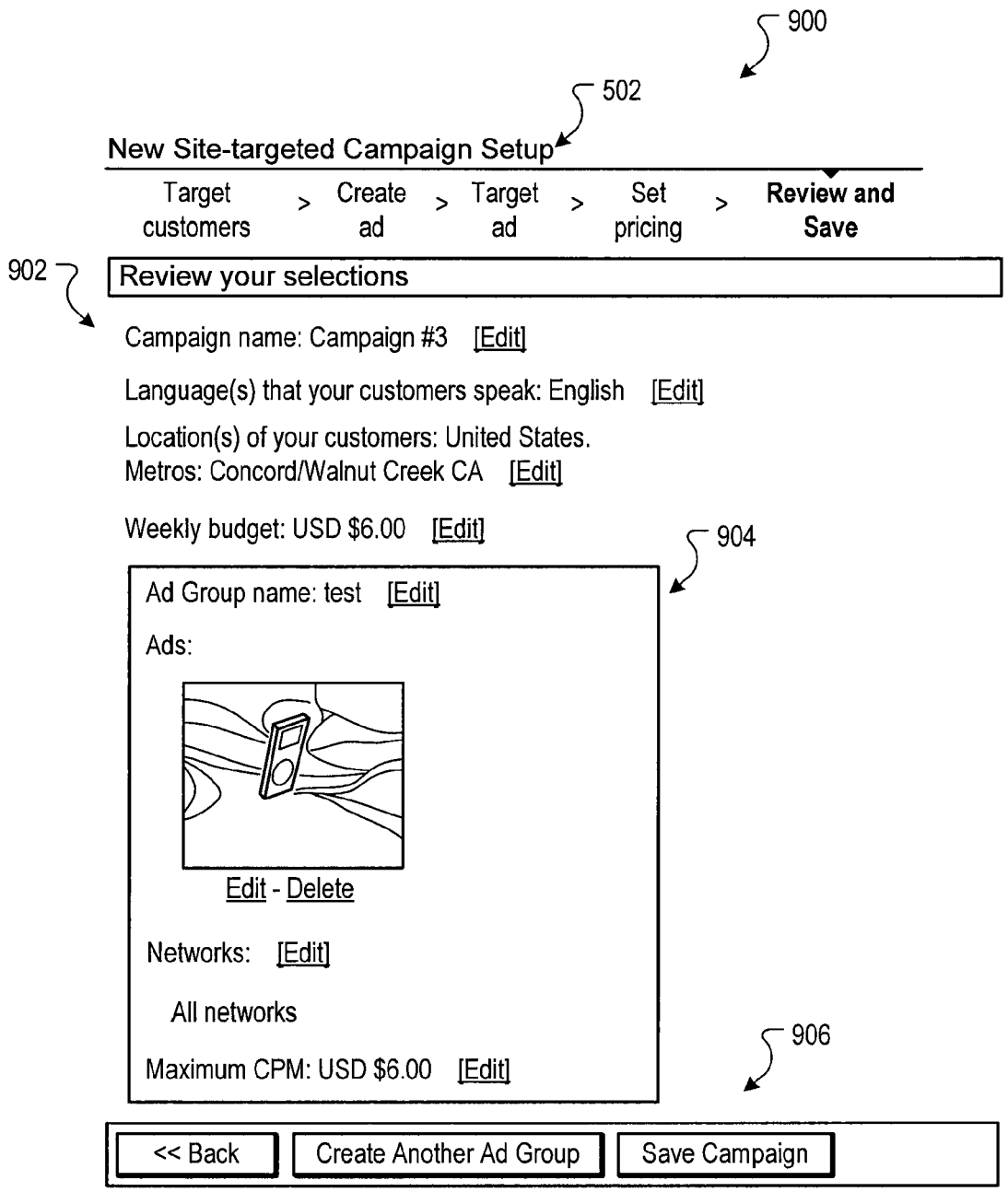

FIG. 9 is a screen shot of an example review environment 900, as indicated by the highlighted "Review and Save" setup stage on the setup menu 502. The review environment 900 summarizes the advertisements parameters entered by an advertiser during the process of creating an advertisement campaign. A parameter summary 902 can, for example, summarize advertisement parameters, such as the campaign name, target languages, national, regional and local locations of the target customers/viewers, and a weekly budget.

An Ad Group summary 904 can also be displayed, if applicable. As shown in FIG. 9, an Ad group summary 904 displays a still image of one or more advertisements in the Ad group, a list of target networks, and a cost per action for the advertisements in the Ad group.

Navigation buttons 906 can be selected to return to the previous advertisement front end environment 800, create another Ad group, or save the campaign.

Figure 10:
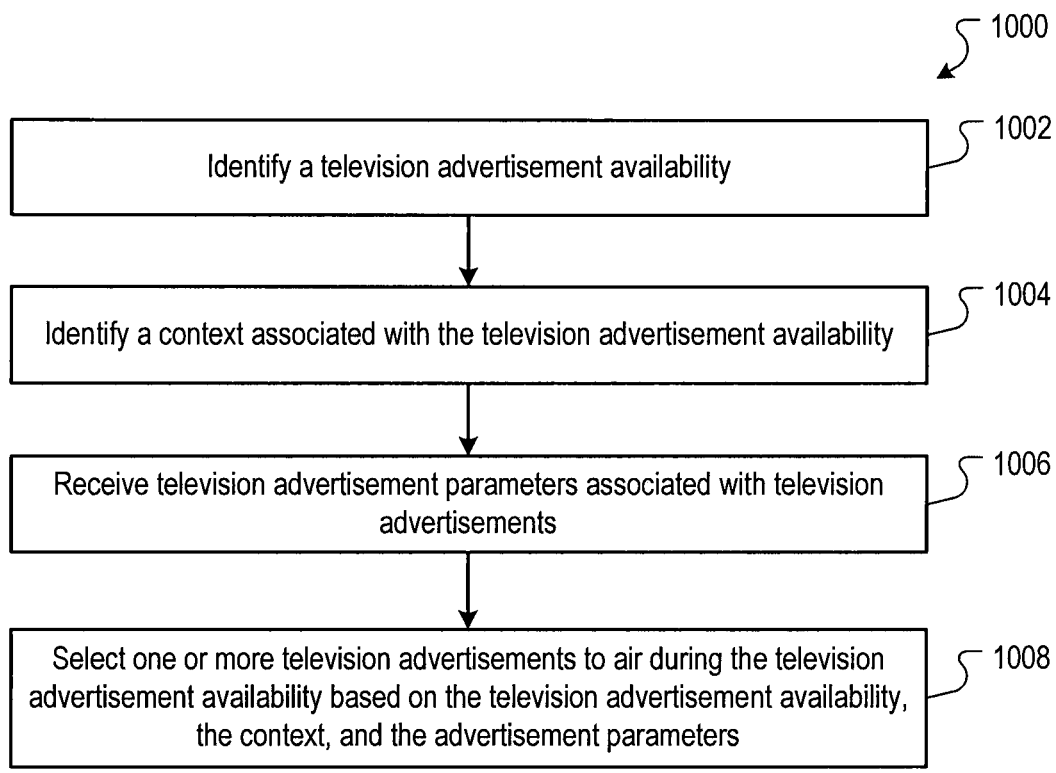
FIG. 10 is a flow diagram of an example process of selecting television advertisements for advertisement availability.

FIG. 10 is a flow diagram of an example process 1000 of selecting television advertisements for advertisement availability. The process 1000 can, for example, be implemented in the advertisement system 100 of FIG. 1 and/or the television advertisement scheduling and reporting system 400.

Stage 1002 identifies television advertisement availability. For example, the scheduler engine 124 can receive advertisement availability data from a television provider 160 and identify advertisement availabilities, such as advertisement spots.

Stage 1004 identifies a context associated with the television advertisement availability. For example, the scheduler engine 124 and/or the candidate engine 126 can identify a context, e.g., a program type associated with an advertisement availability, based on the advertisement availability data, or based on other data that can be searched according to parameters specified in the advertisement availability data, e.g. the advertisement availabilities can be cross-referenced with programming and channel guide information provided by third parties.

Stage 1006 receives television advertisement parameters associated with television advertisements. For example, the scheduler engine 124 and/or the candidate engine 126 can receive television advertisement parameters from the advertisement parameter data store 104. The advertisement parameters can be selected based on one or more filtering rules, based on the identified context, or by some other process.

Stage 1008 selects one or more television advertisements to air during the television advertisement availability based on the television advertisement availability, the context, and the advertisement parameters. For example, the scheduler engine 124 can perform an auction to select the highest ranked advertisements.

Figure 11:
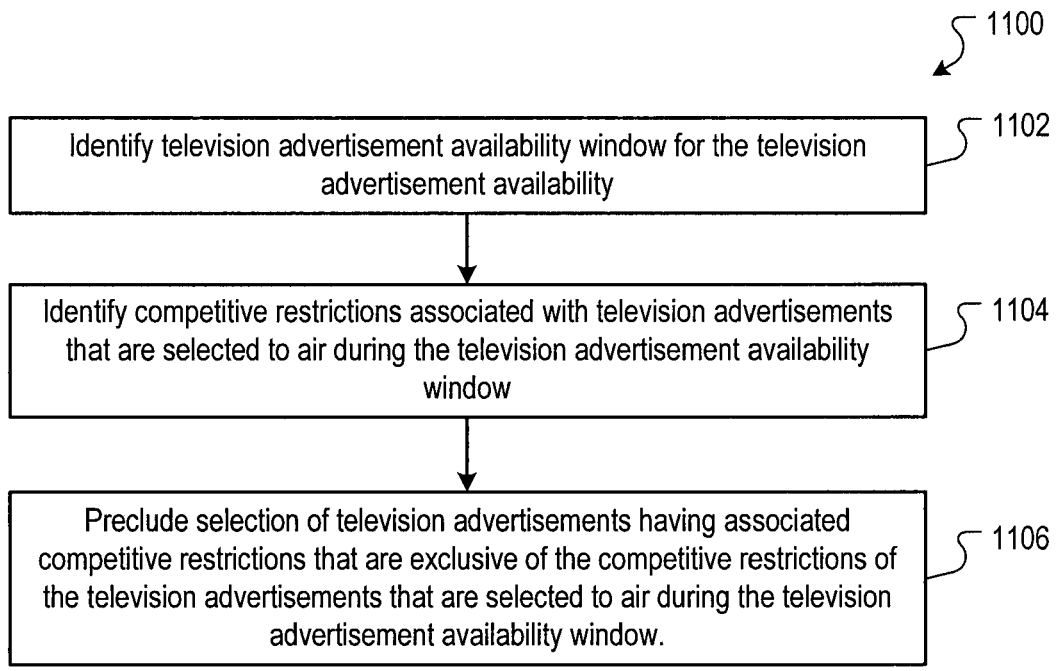
FIG. 11 is a flow diagram of an example process for restricting television advertisements.

FIG. 11 is a flow diagram of an example process 1100 for restricting television advertisements. The process 1100 can, for example, be implemented in the advertisement system 100 of FIG. 1 and/or the television advertisement scheduling and reporting system 400.

Stage 1102 identifies a television advertisement availability window for the television advertisement availability. For example, the scheduler engine 124 and/or the candidate engine 126 can identify a television advertisement availability window that is advertisement based, e.g., defined by adjacent advertisement spots, or time based, e.g., defined by a time window.

Stage 1104 identifies competitive restrictions associated with television advertisements that are selected to air during the television advertisement availability window. For example, the scheduler engine 124 and/or the candidate engine 126 can identify competitive restrictions stored in the advertisement parameter data store 104 advertisements currently selected to air during the television advertisement availability window.

Stage 1106 precludes selection of television advertisements having associated competitive restrictions that are exclusive of the competitive restrictions of the television advertisements that are selected to air during the television advertisement availability window. For example, the scheduler engine 124 and/or the candidate engine 126 may preclude selection of advertisements for company B if an advertisement for company A, a direct competitor, has aired or will air during the advertisement availability window.

Figure 12:
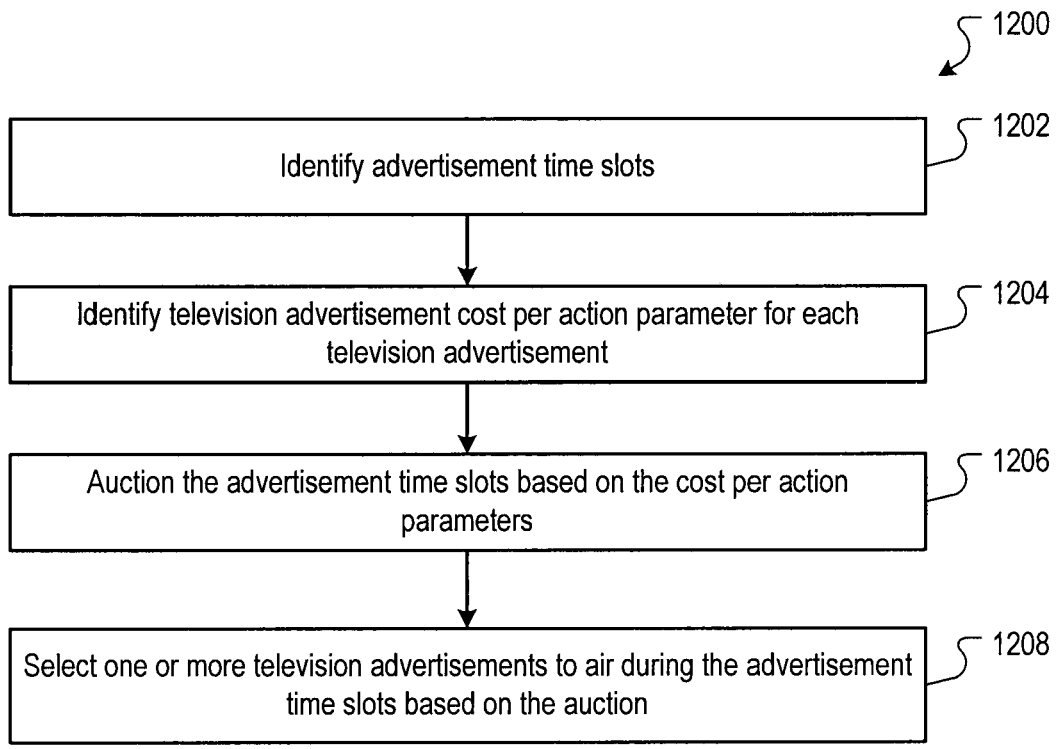
FIG. 12 is a flow diagram of an example process for auctioning advertisement spots for television advertisements.

FIG. 12 is a flow diagram of an example process 1200 for auctioning advertisement spots for television advertisements. The process 1200 can, for example, be implemented in the advertisement system 100 of FIG. 1 and/or the television advertisement scheduling and reporting system 400.

Stage 1202 identifies advertisement time slots. For example, the scheduler engine 124 can receive advertisement availability data from a television provider 160 and identify advertisement time slots.

Stage 1204 identifies a television advertisement cost per action parameter for each television advertisement. For example, the scheduling engine 124 and/or the candidate engine 126 can access the advertisement parameters 104 and identify advertisement cost per action parameters.

Stage 1206 auctions the advertisement time slots based on the cost per action parameters. For example, the scheduler engine 124 can perform an auction based on the cost per action parameters.

Stage 1208 selects one or more television advertisements to air during the advertisement time slots based on the auction. For example, the scheduler engine 124 can select one or more advertisement based on the resulting auction rank of the advertisements.

Figure 13:
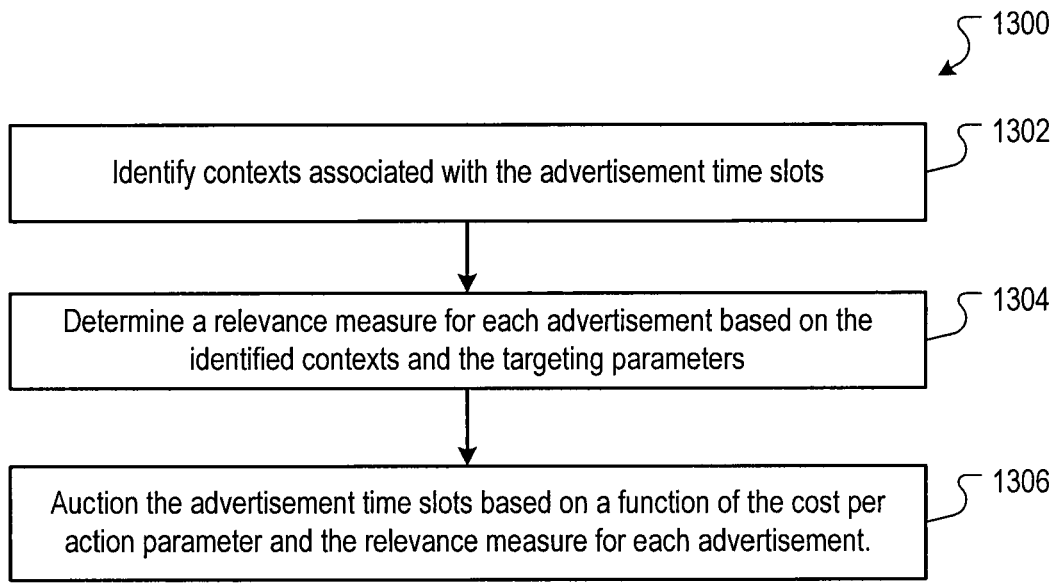
FIG. 13 is a flow diagram of an example process for auctioning advertisement spots based on a cost parameter and a quality parameter.

FIG. 13 is a flow diagram of an example process for auctioning 1300 advertisement spots based on a cost parameter and a quality parameter. The process 1300 can, for example, be implemented in the advertisement system 100 of FIG. 1 and/or the television advertisement scheduling and reporting system 400.

Stage 1302 identifies contexts associated with the advertisement time slots. For example, the scheduler engine 124 and/or the candidate engine 126 can identify a context based on a program type associated with an advertisement availability; or based on the advertisement time slot; or based on the broadcast network; or based on close-captioned text; or based on other data that can be searched according to the advertisement time slot, e.g. the advertisement availabilities can be cross-referenced with programming and channel guide information.

Stage 1304 determines a relevance measure for each advertisement based on the identified contexts and the targeting parameters. For example, the scheduler engine 124 and/or the candidate engine 126 can access the targeting parameters of an advertisement and determine whether the corresponding advertisement is relevant to the context.

Stage 1306 auctions the advertisement time slots based on a function of the cost per action parameter and the relevance measure for each advertisement. For example, the scheduler engine 124 can auction the advertisements based on a function of the cost per action parameter and the relevance measure so that advertisements that are more relevant to a context can be positively adjusted in an auction ranking.

In another implementation, advertisements can be auction solely on a cost per action parameter and a performance measure. For example, advertisers may desire to air commercials for a particular program with regard to context, such as an extremely popular sporting event for which ratings are projected to be very high across all demographics. Accordingly, the context can be ignored in some auction processes.

Figure 14:
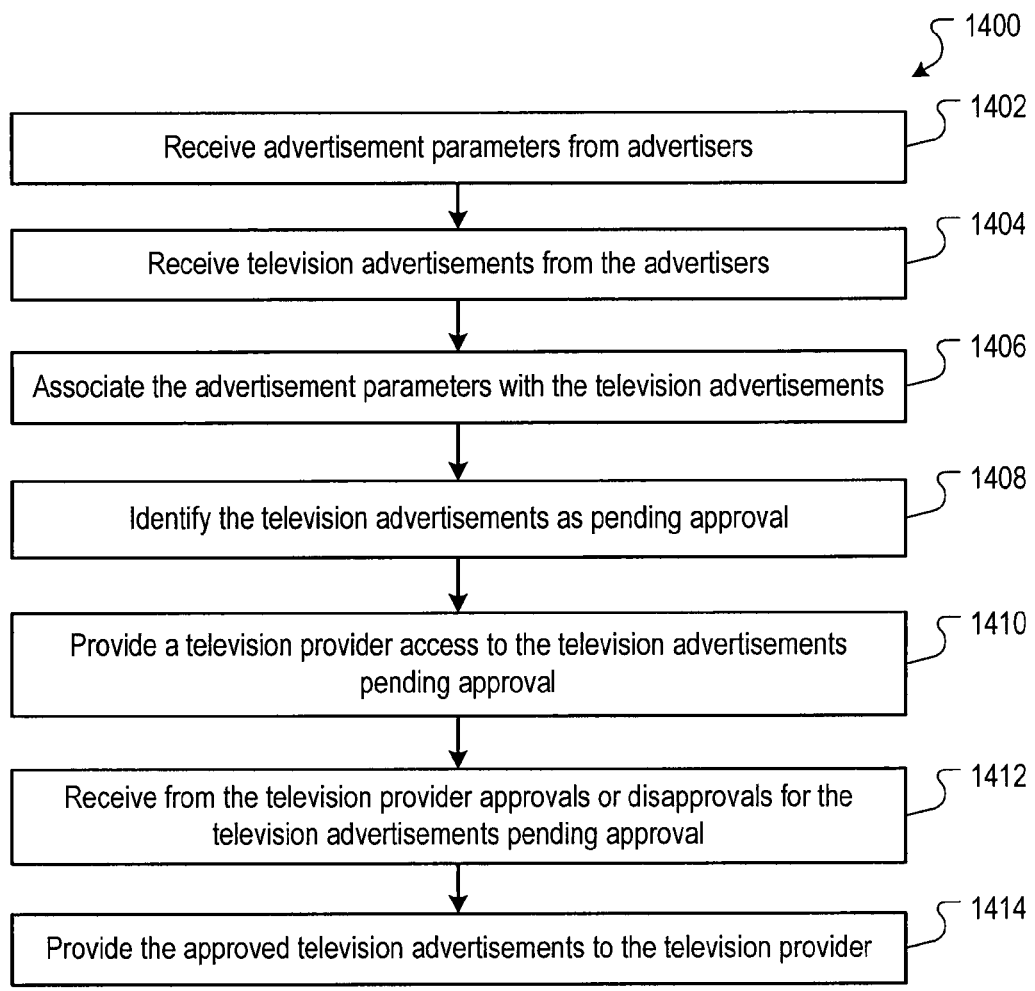
FIG. 14 is a flow diagram of an example process for receiving and distributing advertisements from advertisers.

FIG. 14 is a flow diagram of an example process 1400 for receiving and distributing advertisements from advertisers. The process 1400 can, for example, be implemented in the advertisement system 100 of FIG. 1 and/or the television advertisement front end system 200 of FIG. 2 and the television advertisement distribution system 300 of FIG. 3.

Stage 1402 receives advertisement parameters from advertisers. For example, the advertisement front end engine 120 or advertisement front end interface 202 can receive advertisement parameters from an advertiser.

Stage 1404 receives television advertisements from the advertisers. For example, the advertisement front end engine 120 or advertisement front end interface 202 can receive television advertisements from the advertisers.

Stage 1406 associates the advertisement parameters with the television advertisements. For example, the advertisement front end engine 120 or advertisement front end interface 202 can store the advertisements and advertisement parameters in the advertisement data store 102 and the advertisement parameter data store 104 as associated data.

Stage 1408 identifies the television advertisements as pending approval. For example, the approval engine 208 can identify any newly-stored advertisement in the advertisement data store 102 as pending approval.

Stage 1410 provides a television provider or a representative of the television provider access to the television advertisements pending approval. For example, the approval engine 208 can provide a television provider access to the television advertisements pending approval so that the provider can review the advertisements. The television advertisements or access to the television advertisements can, for example, be stored in the approval bin 210.

Stage 1412 receives from the television provider approvals or disapprovals for the television advertisements pending approval. For example, the approval engine 208 can receive from the television provider approval data or disapproval data related to the advertisements pending approval.

Stage 1414 provides the approved television advertisements to the television provider. For example, the advertisement distribution engine 122 and the video streamer 212 can provide the approved television advertisements to the provider 160.

Figure 15:
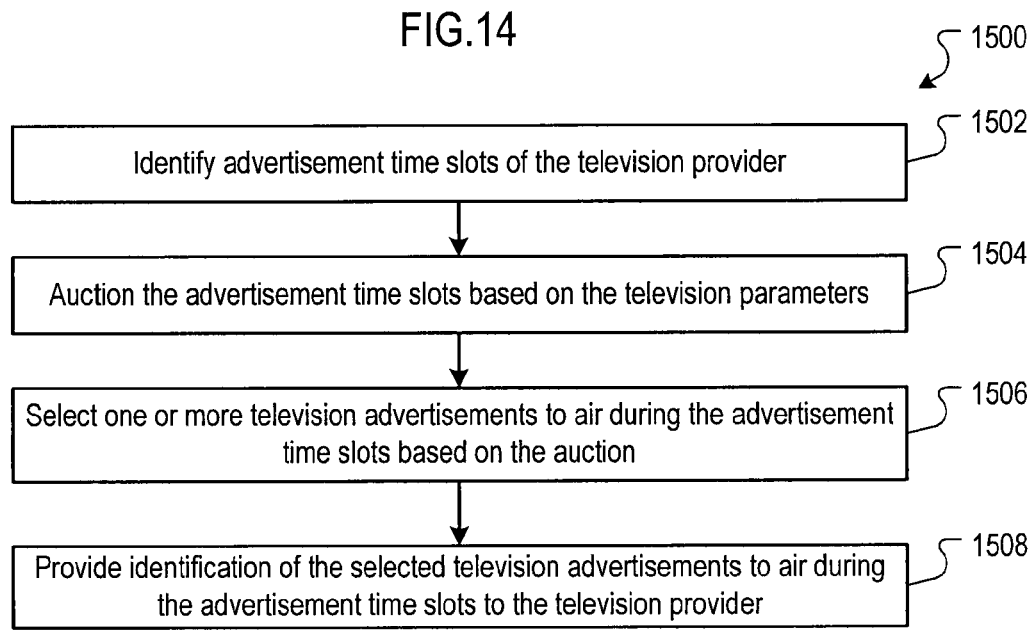
FIG. 15 is a flow diagram of an example process for providing auction results to a television provider.

FIG. 15 is a flow diagram of an example process 1500 for providing auction results to a television provider. The process 1500 can, for example, be implemented in the advertisement system 100 of FIG. 1 and/or the television advertisement scheduling and reporting system 400.

Stage 1502 identifies advertisement time slots of the television provider. For example, the scheduler engine 124 can receive advertisement availability data from a television provider 160 and identify advertisement time slots.

Stage 1504 auctions the advertisement time slots based on the television parameters. For example, the scheduler engine 124 can auction the advertisement time slots according to the advertisement parameters stored in the parameter data store 104 and other data, such as performance data stored in the performance data store 108.

Stage 1506 selects one or more television advertisements to air during the advertisement time slots based on the auction. For example, the scheduler engine 124 can select the highest ranked advertisements of an auction for airing during the advertisement time slots.

Stage 1508 provides identification of the selected television advertisements to air during the advertisement time slots to the television provider. For example, the scheduler engine 124 can provide advertisement identifiers of the advertisements selected in stage 1506 to the provider 160.

The apparatus, methods, flow diagrams, and structure block diagrams described in this patent document may be implemented in computer processing systems including program code comprising program instructions that are executable by the computer processing system. Other implementations may also be used. Additionally, the flow diagrams and structure block diagrams described in this patent document, which describe particular methods and/or corresponding acts in support of steps and corresponding functions in support of disclosed structural means, may also be utilized to implement corresponding software structures and algorithms, and equivalents thereof.

Embodiments of the subject matter described in this specification can be implemented as one or more computer program products, i.e., one or more modules of computer program instructions encoded on a tangible program carrier for execution by, or to control the operation of, data processing apparatus. The computer readable medium can be a machine readable storage device, a machine readable storage substrate, a memory device, a composition of matter effecting a machine readable propagated signal, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method, comprising:
accessing, by a computer system, television advertisements stored in a television advertisement data store;
transcoding, by the computer system, each television advertisement into a plurality of different presentation formats, wherein the presentation formats include television formats utilized by television providers;
accessing, by the computer system, corresponding approval criteria for each presentation format, the approval criteria for each particular presentation format being criteria by which a television advertisement transcoded into the particular presentation format is evaluated against;
for each presentation format in which the television advertisement is transcoded:
evaluating, by the computer system, the television advertisement transcoded into the presentation format against the corresponding approval criteria for the presentation format;
automatically approving, by the computer system, the television advertisement in each presentation format that meets the corresponding approval criteria for the presentation format based on the evaluations against the corresponding approval criteria; and
automatically disapproving, by the computer system, the television advertisement in each presentation format that does not meet the corresponding approval criteria for the presentation format based on the evaluations against the corresponding approval criteria.

2. The method of claim 1, wherein the presentation formats include high definition television formats and standard definition television formats.

3. The method of claim 1, wherein the presentation formats include a web-based format.

4. The method of claim 1, wherein the corresponding approval criteria for each presentation format includes color balance criteria.

5. The method of claim 1, wherein the corresponding approval criteria for each presentation format includes sound balance criteria.

6. The method of claim 1, further comprising providing a television provider access to the approved television advertisements.

7. The method of claim 1, further comprising:
receiving, from each of a plurality of television providers, corresponding approval data for each television provider, the corresponding approval data describing each of the approved television advertisements that are further approved for airing on broadcasts of the television provider; and
for each television provider, providing access to only the approved television advertisements that are further approved for airing on broadcasts of the television provider.

8. A system, comprising:
an advertisement data store configured to store television advertisements;
a transcoding engine configured to transcode television advertisements into a plurality of different presentation formats, wherein the presentation formats include television formats utilized by television providers;
an automated approval engine configured to store corresponding approval criteria for each presentation format, the approval criteria for each particular presentation format being criteria by which a television advertisement transcoded into the particular presentation format is evaluated against, and for each presentation format in which the television advertisement is transcoded:
evaluate the television advertisement transcoded into the presentation format against the corresponding approval criteria for the presentation format; and
automatically approve, by the computer system, the television advertisement in each presentation format that meets the corresponding approval criteria for the presentation format based on the evaluations against the corresponding approval criteria; and
automatically disapprove, by the computer system, the television advertisement in each presentation format that does not meet the corresponding approval criteria for the presentation format based on the evaluations against the corresponding approval criteria.

9. The system of claim 8, further comprising:
an approval engine configured to identify a television advertisement pending approval by a television provider, and to receive television provider approval data for the television advertisement and approve or disapprove the television advertisement based on the television provider approval data.

10. The system of claim 8, wherein the presentation formats include high definition television formats and standard definition television formats.

11. The system of claim 8, wherein the corresponding approval criteria for each presentation format includes color balance criteria.

12. The system of claim 8, wherein the corresponding approval criteria for each presentation format includes sound balance criteria.

13. The system of claim 8, wherein the presentation formats include a web-based format.

14. A non-transitory computer readable storage device storing instructions executable by a computer system and that upon such execution cause the computer system to perform operations comprising:
accessing, by the computer system, television advertisements stored in a television advertisement data store;
transcoding, by the computer system, each television advertisement into a plurality of different presentation formats, wherein the presentation formats include television formats utilized by television providers;
accessing, by the computer system, corresponding approval criteria for each presentation format, the approval criteria for each particular presentation format being criteria by which a television advertisement transcoded into the particular presentation format is evaluated against;
for each presentation format in which the television advertisement is transcoded:
evaluating, by the computer system, the television advertisement transcoded into the presentation format against the corresponding approval criteria for the presentation format;
automatically approving, by the computer system, the television advertisement in each presentation format that meets the corresponding approval criteria for the presentation format based on the evaluations against the corresponding approval criteria; and
automatically disapproving, by the computer system, the television advertisement in each presentation format that does not meet the corresponding approval criteria for the presentation format based on the evaluations against the corresponding approval criteria.

* * * * *

UNITED STATES PATENT AND TRADEMARK OFFICE
CERTIFICATE OF CORRECTION

| | | |
|---|---|---|
| PATENT NO. | : 8,566,861 B2 | Page 1 of 1 |
| APPLICATION NO. | : 12/886233 | |
| DATED | : October 22, 2013 | |
| INVENTOR(S) | : Daniel J. Zigmond et al. | |

It is certified that error appears in the above-identified patent and that said Letters Patent is hereby corrected as shown below:

In the Claims:

Claim 8, Column 22, Line 57 – after "format;" delete "and".

Signed and Sealed this
Thirteenth Day of May, 2014

Michelle K. Lee
*Deputy Director of the United States Patent and Trademark Office*